(12) United States Patent
Paul

(10) Patent No.: US 11,513,504 B2
(45) Date of Patent: Nov. 29, 2022

(54) CHARACTERIZING AND MONITORING ELECTRICAL COMPONENTS OF MANUFACTURING EQUIPMENT

(71) Applicant: Applied Materials, Inc., Santa Clara, CA (US)

(72) Inventor: David John Paul, Pflugerville, TX (US)

(73) Assignee: Applied Materials, Inc., Santa Clara, CA (US)

( * ) Notice: Subject to any disclaimer, the term of this patent is extended or adjusted under 35 U.S.C. 154(b) by 159 days.

(21) Appl. No.: 16/657,840

(22) Filed: Oct. 18, 2019

(65) Prior Publication Data

US 2021/0116895 A1   Apr. 22, 2021

(51) Int. Cl.
*G06F 17/00* (2019.01)
*G05B 19/418* (2006.01)
(Continued)

(52) U.S. Cl.
CPC ..... *G05B 19/41875* (2013.01); *G05B 19/404* (2013.01); *G05B 19/4184* (2013.01);
(Continued)

(58) Field of Classification Search
CPC .......... G05B 19/41875; G05B 19/4041; G05B 2219/32194; G05B 2219/322; G05B 2219/32201; G05B 19/404; G06N 20/00; G06F 11/3495; G06F 11/3636; G06F 21/10; G06F 3/1244; G01R 31/2894; H01L 21/67276; H01L 22/12; H04L 63/1441; H02H 1/0061; G01N 21/958; B23K 9/0216; B29C 48/91; H04W 52/246; G01L 5/00

See application file for complete search history.

(56) References Cited

U.S. PATENT DOCUMENTS

| | | | |
|---|---|---|---|
| 2014/0223583 A1* | 8/2014 | Wegner ................. | G06F 3/1244 726/33 |
| 2017/0109646 A1* | 4/2017 | David .................... | H01L 22/12 |

(Continued)

OTHER PUBLICATIONS

ISYSTEM™ Controller, http://www.appliedmaterials.com/products/isystem-controller, retrieved Oct. 30, 2019.
(Continued)

*Primary Examiner* — Tuan A Vu
(74) *Attorney, Agent, or Firm* — Lowenstein Sandler LLP

(57) ABSTRACT

A method includes receiving, from one or more sensors associated with manufacturing equipment, current trace data associated with producing, by the manufacturing equipment, a plurality of products. The method further includes performing signal processing to break down the current trace data into a plurality of sets of current component data mapped to corresponding component identifiers. The method further includes providing the plurality of sets of current component data and the corresponding component identifiers as input to a trained machine learning model. The method further includes obtaining, from the trained machine learning model, one or more outputs indicative of predictive data and causing, based on the predictive data, performance of one or more corrective actions associated with the manufacturing equipment.

20 Claims, 7 Drawing Sheets

(51) Int. Cl.
G06F 11/34 (2006.01)
G06F 11/36 (2006.01)
G05B 19/404 (2006.01)
G06N 20/00 (2019.01)

(52) U.S. Cl.
CPC ...... *G06F 11/3495* (2013.01); *G06F 11/3636* (2013.01); *G06N 20/00* (2019.01); *G05B 2219/31357* (2013.01); *G05B 2219/32193* (2013.01); *G05B 2219/32194* (2013.01); *G05B 2219/32201* (2013.01); *G05B 2219/32234* (2013.01); *G05B 2219/45031* (2013.01)

(56) References Cited

U.S. PATENT DOCUMENTS

| | | | |
|---|---|---|---|
| 2018/0191758 A1* | 7/2018 | Abbaszadeh | H04L 63/1441 |
| 2018/0356807 A1* | 12/2018 | Honda | H01L 21/67276 |
| 2019/0163172 A1* | 5/2019 | Daniel | B23K 9/0216 |
| 2019/0230113 A1* | 7/2019 | Al Faruque | G06F 21/10 |
| 2019/0240888 A1* | 8/2019 | Lossl | B29C 48/91 |
| 2019/0265665 A1* | 8/2019 | Andronic | H02H 1/0061 |
| 2019/0277913 A1* | 9/2019 | Honda | G01R 31/2894 |
| 2020/0047336 A1* | 2/2020 | Savini | G01L 5/00 |
| 2020/0348662 A1* | 11/2020 | Cella | H04W 52/246 |
| 2021/0088867 A1* | 3/2021 | Nagel | G01N 21/8851 |

OTHER PUBLICATIONS https://sense.com/, retrieved Oct. 30, 2019.
https://blog.sense.com/articles/homecheck-fault-detection-diagnostic-analysis/ retrieved Oct. 30, 2019.
https://blog.sense.com/articles/how-does-sense-detect-my-devices/ retrieved Oct. 30, 2019.
Future House | Smarter Home Electrical Metering, https://www.thisoldhouse.com/how-to/future-house-smarter-home-electrical-metering, retrieved Oct. 30, 2019.
AI in depth: monitoring home appliances from power readings with ML, https://cloud.google.com/blog/products/ai-machine-learning/monitoring-home-appliances-from-power-readings-with-ml, retrieved Oct. 30, 2019.

* cited by examiner

CHARACTERIZING AND MONITORING ELECTRICAL COMPONENTS OF MANUFACTURING EQUIPMENT

TECHNICAL FIELD

The present disclosure relates to electrical components, and, more particularly, characterizing and monitoring electrical components.

BACKGROUND

Products may be produced by performing one or more manufacturing processes using manufacturing equipment. For example, semiconductor manufacturing equipment may be used to produce wafers via semiconductor manufacturing processes. A first portion of the products may be normal (e.g., meet specification) and a second portion of the products may be abnormal (e.g., not meet specification). Over time, the semiconductor manufacturing equipment may have abnormalities that lead to unscheduled down time, equipment damage, and/or product loss.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In an aspect of the disclosure, a method includes receiving, from one or more sensors associated with manufacturing equipment, current trace data associated with producing, by the manufacturing equipment, a plurality of products. The method further includes performing signal processing to break down the current trace data into a plurality of sets of current component data mapped to corresponding component identifiers. The method further includes providing the plurality of sets of current component data and the corresponding component identifiers as input to a trained machine learning model. The method further includes obtaining, from the trained machine learning model, one or more outputs indicative of predictive data. The method further includes causing, based on the predictive data, performance of one or more corrective actions associated with the manufacturing equipment.

In another aspect of the disclosure, a method includes receiving a plurality of sets of historical component data mapped to corresponding component identifiers. Each corresponding component identifier is associated with a corresponding component of manufacturing equipment. Each of the plurality of sets of historical component data corresponds to energy usage during operation of the corresponding component. The method further includes receiving a corresponding set of historical performance data for each of the plurality of sets of historical component data. The method further includes training a machine learning model with data input including the plurality of sets of historical component data and target output including the corresponding set of historical performance data for each of the plurality of sets of historical component data to generate a trained machine learning model. The trained machine learning model is capable of generating one or more outputs indicative of predictive data to perform one or more corrective actions associated with the manufacturing equipment.

In another aspect of the disclosure, a non-transitory machine-readable storage medium storing instructions which, when executed cause a processing device to perform operations including receiving, from one or more sensors associated with manufacturing equipment, current trace data associated with producing, by the manufacturing equipment, a plurality of products. The operations further include performing signal processing to break down the current trace data into a plurality of sets of current component data mapped to corresponding component identifiers. The operations further include providing the plurality of sets of current component data and the corresponding component identifiers as input to a trained machine learning model. The operations further include obtaining, from the trained machine learning model, one or more outputs indicative of predictive data. The operations further include causing, based on the predictive data, performance of one or more corrective actions associated with the manufacturing equipment.

BRIEF DESCRIPTION OF THE DRAWINGS

The present disclosure is illustrated by way of example, and not by way of limitation in the figures of the accompanying drawings.

DETAILED DESCRIPTION

Figure 1:
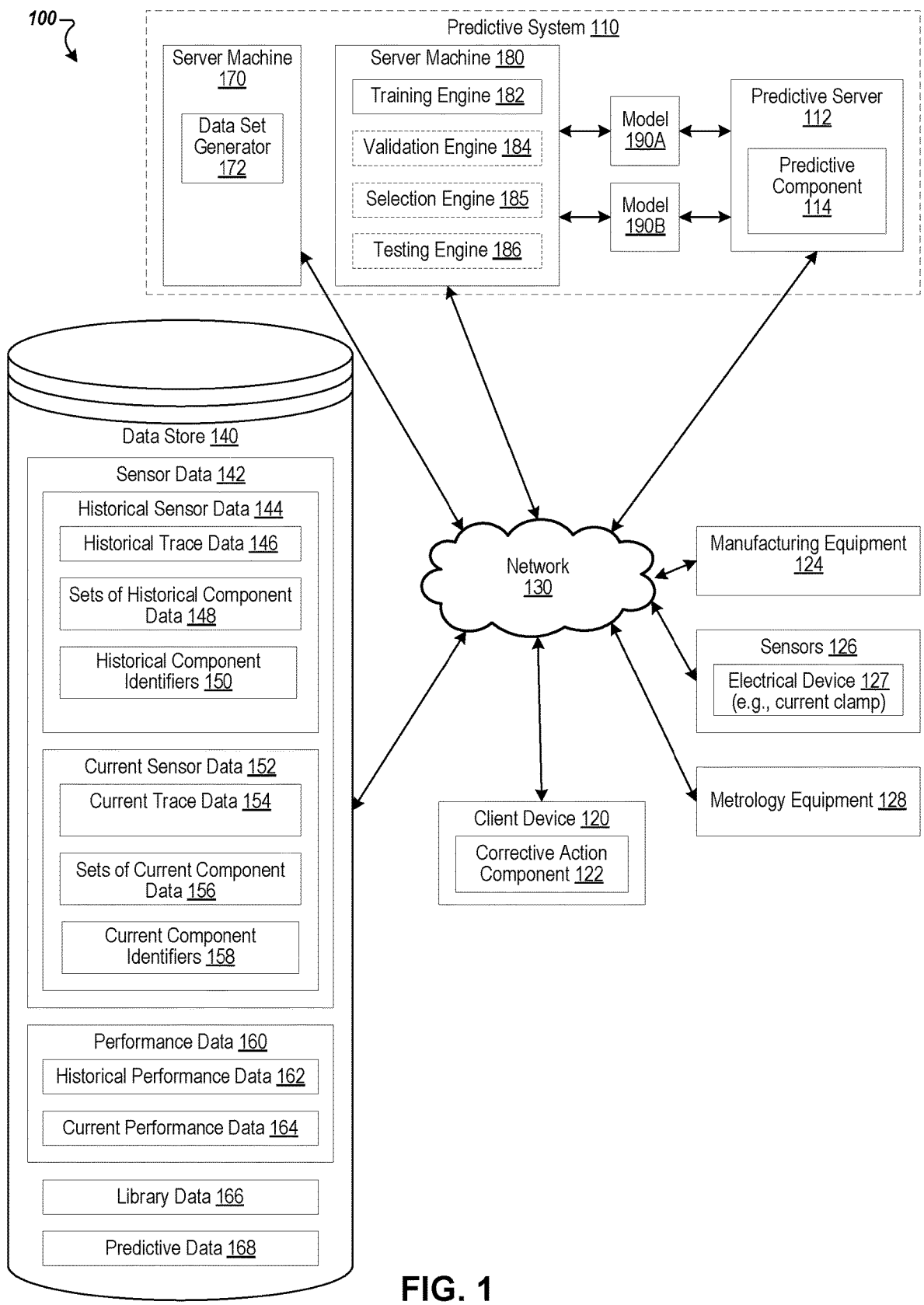
FIG. 1 is a block diagram illustrating an exemplary system architecture, according to certain embodiments.

Described herein are technologies directed to characterizing and monitoring electrical components of manufacturing equipment. Manufacturing equipment may be used to produce products (e.g., wafers). For example, manufacturing equipment may execute a recipe to produce wafers. Sensors associated with the manufacturing equipment capture trace data (e.g., voltage values, electrical current values) over time during the production of the products (e.g., during execution of the recipe to produce wafers). Over time, some of the products may be abnormal (e.g., not meet specification, have defects) and/or some of the manufacturing equipment may have abnormalities (e.g., failing parts, high energy usage components, variation of same type of components between different tools).

In some conventional systems, components associated with manufacturing equipment have a catastrophic failure (e.g., unexpected failure). The unexpected failure of the components results in unplanned downtime, expedited transportation of new components, unscheduled user time to replace the components, product loss, and/or damage to the manufacturing equipment.

In some conventional systems, trial and error is used to attempt to improve product quality, manufacturing processes, and/or manufacturing equipment. This trial and error results in premature replacement of components, abnormal products, user time, inefficient manufacturing parameters, and/or damage to the manufacturing equipment.

Some conventional systems include first and second manufacturing equipment of the same type (e.g., same type of tool, same type of chamber, etc.), where the second manufacturing equipment produces products of a second quality that is lower than a first quality of products produced by the first manufacturing equipment. Trial and error may be used to attempt to configure the second manufacturing equipment to produce products of the same quality as the first manufacturing equipment, which results in premature replacement of components, abnormal products, user time, replacement of the second manufacturing equipment, and/or less usage of the second manufacturing equipment.

The devices, systems, and methods disclosed herein provide characterizing and monitoring of components (e.g., electrical components) of manufacturing equipment. In one embodiment, a processing device receives trace data (e.g., electrical current data, voltage data) from one or more sensors associated with manufacturing data producing products (e.g., executing one or more recipes). The one or more sensors may include a Current Transformer (CT) clamp that senses magnetic fluctuations in an electrical feed conductor coupled to the manufacturing equipment and converts the magnetic fluctuations into the trace data. The processing device performs signal processing to break down the trace data into sets of component data mapped to component identifiers (e.g., a first portion of the trace data corresponds to a first component and a second portion of the trace data corresponds to a second component, see FIG. 5).

In some embodiments, the signal processing is based on a library (e.g., library data, mapping data) that includes sets of historical component data mapped to component identifiers. The processing device compares the trace data to the library to determine sets of component data within the trace data (e.g., the trace data is the sum of sets of component data). In some embodiments, the processing device determines that a set of component data is not in the library. In this instance, the processing device may later determine a component that corresponds to the set of component data (e.g., via user input) and may add the set of component data mapped to the component to the library. The processing device may cause a user device to display a prompt requesting user input to identify a component that is executing.

In some embodiments, to perform the signal processing, the processing device provides the trace data as input to a trained machine learning model. The processing device receive, from the trained machine learning model, outputs indicative of predictive data including sets of component data mapped to component identifiers. In some embodiments, the processing device provides a visual representation of at least a portion of the predictive data and receives, via a user device, user input confirming or overriding the predictive data. The processing device uses the user input to re-train the trained machine learning model.

Responsive to determining the sets of component data and the component identifiers, the processing device provides the sets of component data and the component identifiers as input to a trained machine learning model (e.g., a model different from the model associated with signal processing). The processing device obtains, from the trained machine learning model, one or more outputs indicative of predictive data. The processing device may cause, based on the predictive data, performance of a corrective action associated with the manufacturing equipment. The predictive data may include one or more of: a predicted fail date for a component of the manufacturing equipment; predicted energy usage of the component; predicted variance of the component compared to other similar components; or a predicted product quality (e.g., defective wafers, non-defective wafers) to be caused by the component. The performance of the corrective action may include one or more of: replacement of the component prior to failure of the component; preventative maintenance of the component; providing an alert to a user; or updating manufacturing parameters.

In some embodiments, a processing device trains a machine learning model for the determining of predictive data. The processing device trains the machine learning model with data input including sets of historical component data and target output including historical performance data. The trained machine learning model may be capable of generating one or more outputs indicative of predictive data to perform the corrective action associated with the manufacturing equipment.

In some embodiments, a processing device may train a machine learning model for the performing of signal processing. The processing device may train the machine learning model with data input including historical trace data and target output including historical component data mapped to component identifiers. The trained machine learning model may be used to perform signal processing to break down trace data into sets of component data mapped to component identifiers. In some embodiments, the trained machine learning model for determining predictive data is different than the trained machine learning model for signal processing. In some embodiments a trained machine learning model (e.g., an ensemble model) may be used to perform the signal processing and determine the predictive data.

In some embodiments, the signal processing may be characterizing the electrical components and the determining whether a corrective action is to be performed is monitoring of the electrical components. The electrical components may be part of a semiconductor manufacturing system (e.g., Wafer Front End (WFE) semiconductor equipment) that may perform one or more of deposition, lithography, etching, cleaning, or process control.

Aspects of the present disclosure result in technological advantages of significant reduction in energy consumption (e.g., battery consumption), bandwidth used, processor overhead, and so forth. For example, conventional systems perform iterations of trial and error to attempt to improve product quality, manufacturing processes, and/or manufacturing equipment. This trial-and-error process requires more and more energy consumption, bandwidth, and processor overhead for each iteration (e.g., generating instructions via trial and error, transmitting the instructions, receiving feedback, generating updated instructions via trial and error, and so forth). The present disclosure results in reduced energy consumption, bandwidth, and processor overhead by using signal processing and a machine learning model to obtain predictive data and cause performance of corrective actions based on the predictive data and avoiding iterations of trial and error. The present disclosure may result in predicting component failure (e.g., predictive data) and scheduling component replacement (e.g., corrective action) to avoid unplanned downtime, expedited transportation of new component, unscheduled user time, and damage to manufacturing equipment. The present disclosure may generate predictive data (e.g., predicted failure data, optimized manufacturing parameters, etc.) to avoid premature replacement of components, abnormal products, user time, inefficient manufacturing parameters, and damage to manufacturing equipment associated with trial and error of conventional systems. The present disclosure may result in predicting manufacturing parameters (e.g., components, process parameters, etc.) of first manufacturing equipment producing products of a greater quality (e.g., predictive data) and implementing those manufacturing parameters for other manufacturing equipment (e.g., corrective action). The present disclosure may predict one or more causes of abnormal products to perform a corrective action that may lower amount of defective products and/or cause maintenance to be performed on the manufacturing equipment to avoid downtime and user time associated with major corrective repairs, and the like.

FIG. 1 is a block diagram illustrating an exemplary system 100 (exemplary system architecture), according to certain embodiments. The system 100 includes a client device 120, manufacturing equipment 124, sensors 126, metrology equipment 128, a predictive server 112, and a data store 140. The predictive server 112 may be part of a predictive system 110. The predictive system 110 may further include server machines 170 and 180.

The sensors 126 may provide sensor data 142 (e.g., sensor values, features, trace data) associated with manufacturing equipment 124 (e.g., associated with producing, by manufacturing equipment 124, corresponding products, such as wafers). The sensor data 142 may be used for equipment health and/or product health (e.g., product quality). The manufacturing equipment 124 may produce products following a recipe or performing runs over a period of time. Sensor data 142 received over a period of time (e.g., corresponding to at least part of a recipe or run) may be referred to as trace data (e.g., historical trace data 146, current trace data 154) received from different sensors 126 over time.

In some embodiments, the sensors 126 include an electrical device 127 that performs electrical measurements of an electrical feed conductor (e.g., electrical feed lines) coupled to the manufacturing equipment 124 (e.g., that powers components of the manufacturing equipment 124). The electrical device 127 may be coupled to (e.g., clamped around) a main electrical input to a tool of manufacturing equipment 124 or to a chamber interface of the manufacturing equipment 124. The electrical device 127 senses properties of the electrical feed conductor (e.g., magnetic fluctuations in the electrical feed conductor, electrical current, voltage, etc.) and converts the properties into sensor data 142 (e.g., trace data, historical trace data 146, current trace data 154). The electrical device 127 may measure sensor data 142 including values of one or more of electrical current, magnitude of Alternating Current (AC), phase, waveform (e.g., AC waveform, pulse waveform), Direct Current (DC), non-sinusoidal AC waveforms, voltage, or the like.

The electrical device 127 may include a clamp that clamps (e.g., via jaws) around an electrical feed conductor. The electrical device 127 may use a clamp to perform electrical measurements of the electrical feed conductor without making physical contact with the electrical feed conductor. The electrical device 127 may be one or more of a current clamp, a current probe, a CT clamp, an iron vane clamp, a Hall effect clamp, a Rogowski coil current sensor, or the like. In some embodiments, the electrical device 127 includes a first current clamp to clamp around a first service main (e.g., incoming power) and a second current clamp to clamp around a second service main (e.g., outgoing power). In some embodiments, the electrical device 127 is installed in (e.g., coupled to incoming power main and outgoing power main of, coupled to busbars of) an electrical control panel that powers the manufacturing equipment 124.

In some embodiments, the electrical device 127 includes a first current clamp, a second current clamp, and a cable. In some embodiments, the electrical device 127 may receive electrical current data from the current clamps and voltage data from the cable and the sensor data 142 (e.g., trace data) may include the current data and the voltage data. The first current clamp may clamp around a first service main of the electrical system, the second current clamp may clamp around a second service main of the electrical system, and the cable may be coupled to the electrical system. For example, the cable may be coupled to a breaker of the electrical system. In some embodiments, the electrical device 127 is configured to monitor split-phase service (e.g., the electrical device includes a first current clamp around a first power feed, a second current clamp around a second power feed, and a cable coupled to a 240V breaker of the split-phase 240V service). In some embodiments, the electrical device 127 is configured to monitor three-phase service (e.g., the electrical device includes a first current clamp around a first power feed, a second current clamp around a second power feed, and a cable coupled to a two-pole breaker across the first power feed and the second power feed of the three-phase 208V service).

Each clamp (e.g., CT-clamp) of the electrical device 170 may include a split ring made of ferrite or soft iron. A wire coil may be wound around one or both halves, forming one winding of a current transformer. The electrical feed conductor around which the clamp is clamped may form the other winding of the current transformer. The clamp may measure electrical current of AC or pulse waveforms. The electrical feed conductor may form the primary winding and the clamp may form the secondary winding.

In some embodiments, sensors 126 may include additional sensors that provide other types of sensor data 142. In some embodiments, the sensor data 142 may include values of one or more of temperature (e.g., heater temperature), spacing (SP), pressure, High Frequency Radio Frequency (HFRF), voltage of Electrostatic Chuck (ESC), electrical current, flow, power, voltage, etc. Sensor data 142 may be associated with or indicative of manufacturing parameters such as hardware parameters (e.g., settings or components (e.g., size, type, etc.) of the manufacturing equipment 124) or process parameters of the manufacturing equipment. The sensor data 142 may be provided while the manufacturing equipment 124 is performing manufacturing processes (e.g., equipment readings when processing products). The sensor data 142 may be different for each product (e.g., each wafer).

In some embodiments, the sensor data 142 (e.g., historical trace data 146, sets of historical component data 148, current trace data 154, sets of current component data 156, etc.) may be processed (e.g., by the client device 120 and/or by the predictive server 112). Processing of the sensor data 142 may include generating features. In some embodiments, the features are a pattern in the sensor data 142 (e.g., slope, width, height, peak, etc.) or a combination of sensor values from the sensor data 142 (e.g., power derived from voltage and current, etc.). The sensor data 142 may include features and the features may be used by the predictive component 114 for performing signal processing and/or for obtaining predictive data 168 for performance of a corrective action.

The performance data 160 may include data associated with the manufacturing equipment 124 and/or products produced by the manufacturing equipment 124. The performance data 160 may be used for supervised machine learning.

In some embodiments, the performance data 160 may include an indication of a lifetime of a component of manufacturing equipment 124 (e.g., time of failure), manufacturing parameters of manufacturing equipment 124, maintenance of manufacturing equipment 124, energy usage of a component of manufacturing equipment 124, variance in components (e.g., of same part number) of manufacturing equipment 124, or the like.

Performance data 160 may include an indication of variance in components (e.g., of the same type, of the same part number) of manufacturing equipment. Determining a variance in components may be referred to as chamber matching for product-to-product uniformity. The performance data 160 may indicate if the variance (e.g., jitter, slope, peak, etc.) contributes to product-to-product variation. The performance data 160 may indicate if a variance provides an improved wafer (e.g., Radio Frequency (RF) generator better matched, feedback loop tuned better, newer firmware, better chips).

In some embodiments, the performance data 160 is associated with a quality of products produced by the manufacturing equipment 124. The metrology equipment 128 may provide performance data 160 (e.g., property data of wafers, yield, metrology data) associated with products (e.g., wafers) produced by the manufacturing equipment 124. The performance data 160 may include a value of one or more of film property data (e.g., wafer spatial film properties), dimensions (e.g., thickness, height, etc.), dielectric constant, dopant concentration, density, defects, etc. The performance data 160 may be of a finished or semi-finished product. The performance data 160 may be different for each product (e.g., each wafer). The performance data 160 may indicate whether a product meets a threshold quality (e.g., defective, not defective, etc.). The performance data 160 may indicate a cause of not meeting a threshold quality.

In some embodiments, the client device 120 may provide performance data 160 (e.g., product data, equipment data). The client device 120 may provide (e.g., based on user input) performance data 160 that indicates an abnormality in products (e.g., defective products) and/or manufacturing equipment 124 (e.g., component failure, maintenance, energy usage, variance of a component compared to similar components, etc.). The performance data 160 may include an amount of products that have been produced that were normal or abnormal (e.g., 98% normal products). Performance data 160 may indicate an amount of products that are being produced that are predicted as normal or abnormal. The performance data 160 may include one or more of yield a previous batch of products, average yield, predicted yield, predicted amount of defective or non-defective product, or the like. For example, if yield on a first batch of product is 98% (e.g., 98% of the products were normal and 2% were abnormal), the client device 120 may provide performance data 160 indicating that the upcoming batch of product is to have a yield of 98%.

Each instance (e.g., set) of sensor data 142 may correspond to a corresponding product carrier, a corresponding timestamp, and/or a corresponding product (e.g., wafer). In some embodiments, each instance (e.g., set) of performance data 160 may correspond to a corresponding product carrier, a corresponding timestamp, and/or a corresponding product (e.g., wafer). In some embodiments, the performance data 160 corresponds to a set of products (e.g., 2% of the set of products are abnormal).

In some embodiments, the predictive system 110 may generate predictive data 168 using supervised machine learning (e.g., supervised data set, performance data 160 includes metrology data, etc.). In some embodiments, the predictive system 110 may generate predictive data 168 using semi-supervised learning (e.g., semi-supervised data set, performance data 160 is a predictive percentage, etc.). In some embodiments, the predictive system 110 may generate predictive data 168 using unsupervised machine learning (e.g., unsupervised data set, clustering, clustering based on performance data 160, etc.).

The client device 120, manufacturing equipment 124, sensors 126, metrology equipment 128, predictive server 112, data store 140, server machine 170, and server machine 180 may be coupled to each other via a network 130 for generating predictive data 168 to perform corrective actions.

In some embodiments, network 130 is a public network that provides client device 120 with access to the predictive server 112, data store 140, and other publically available computing devices. In some embodiments, network 130 is a private network that provides client device 120 access to manufacturing equipment 124, sensors 126, metrology equipment 128, data store 140, and other privately available computing devices. Network 130 may include one or more Wide Area Networks (WANs), Local Area Networks (LANs), wired networks (e.g., Ethernet network), wireless networks (e.g., an 802.11 network or a Wi-Fi network), cellular networks (e.g., a Long Term Evolution (LTE) network), routers, hubs, switches, server computers, cloud computing networks, and/or a combination thereof.

The client device 120 may include a computing device such as Personal Computers (PCs), laptops, mobile phones, smart phones, tablet computers, netbook computers, network connected televisions ("smart TV"), network-connected media players (e.g., Blu-ray player), a set-top-box, Over-the-Top (OTT) streaming devices, operator boxes, etc. The client device 120 may include a corrective action component 122. Corrective action component 122 may receive user input (e.g., via a Graphical User Interface (GUI) displayed via the client device 120) of an indication associated with manufacturing equipment 124. In some embodiments, the corrective action component 122 transmits the indication to the predictive system 110, receives output (e.g., predictive data 168) from the predictive system 110, determines a corrective action based on the output, and causes the corrective action to be implemented. In some embodiments, the corrective action component 122 obtains sensor data 142 (e.g., current trace data 154) associated with the manufacturing equipment 124 (e.g., from data store 140, etc.) and provides the sensor data 142 (e.g., current trace data 154) associated with the manufacturing equipment 124 to the predictive system 110. In some embodiments, the corrective action component 122 stores sensor data 142 in the data store 140 and the predictive server 112 retrieves the sensor data 142 from the data store 140. In some embodiments, the predictive server 112 may store output (e.g., predictive data 168) of the trained machine learning model(s) 190 in the data store 140 and the client device 120 may retrieve the output from the data store 140. In some embodiments, the corrective action component 122 receives an indication of a corrective action from the predictive system 110 and causes the corrective action to be implemented. Each client device 120 may include an operating system that allows users to one or more of generate, view, or edit data (e.g., indication associated with manufacturing equipment 124, corrective actions associated with manufacturing equipment 124, etc.).

In some embodiments, the historical performance data 162 corresponds to historical property data of products (e.g., produced using manufacturing parameters associated with historical trace data 146) and the predictive data 168 is associated with predicted property data (e.g., of products to be produced or that have been produced using the current trace data 154). In some embodiments, the predictive data 168 is predicted metrology data (e.g., virtual metrology data) of the products to be produced or that have been produced using the current trace data 154. In some embodiments, the predictive data 168 is an indication of abnormalities (e.g., abnormal products, abnormal components, abnormal manufacturing equipment 124, abnormal energy usage, etc.) and one or more causes of the abnormalities. In some embodiments, the predictive data 168 is an indication of an end of life of a component of manufacturing equipment 124.

Performing metrology can be costly in terms of time used, metrology equipment 128 used, energy consumed, bandwidth used to send the metrology data, processor overhead to process the metrology data, etc. By inputting sensor data 142 (e.g., manufacturing parameters that are to be used to manufacture a product, current trace data 154) and receiving output of predictive data 168, system 100 can have the technical advantage of avoiding the costly process of using metrology equipment 128 to generate current performance data 164 for current trace data 154.

Performing manufacturing processes that result in defective products can be costly in time, energy, products, components, manufacturing equipment 124, the cost of identifying the defects and discarding the defective product, etc. By inputting sensor data 142 (e.g., manufacturing parameters that are being used or are to be used to manufacture a product), receiving output of predictive data 168, and performing a corrective action based on the predictive data 168, system 100 can have the technical advantage of avoiding the cost of producing, identifying, and discarding defective products.

Performing manufacturing processes that result in failure of the components of the manufacturing equipment 124 can be costly in downtime, damage to products, damage to equipment, express ordering replacement components, etc. By inputting sensor data 142 (e.g., manufacturing parameters that are being used or are to be used to manufacture a product), receiving output of predictive data 168, and performing corrective action (e.g., predicted operational maintenance, such as replacement, processing, cleaning, etc. of components) based on the predictive data 168, system 100 can have the technical advantage of avoiding the cost of one or more of unexpected component failure, unscheduled downtime, productivity loss, unexpected equipment failure, product scrap, or the like.

Manufacturing parameters may be suboptimal for producing product which may have costly results of increased resource (e.g., energy, coolant, gases, etc.) consumption, increased amount of time to produce the products, increased component failure, increased amounts of defective products, etc. By inputting the sensor data 142 into the trained machine learning model 190, receiving an output of predictive data 168, and performing (e.g., based on the predictive data 168) a corrective action of updating manufacturing parameters (e.g., setting optimal manufacturing parameters), system 100 can have the technical advantage of using optimal manufacturing parameters (e.g., hardware parameters, process parameters, optimal design) to avoid costly results of suboptimal manufacturing parameters.

Corrective action may be associated with one or more of Computational Process Control (CPC), Statistical Process Control (SPC) (e.g., SPC on electronic components to determine process in control, SPC to predict useful lifespan of components, SPC to compare to a graph of 3-sigma, etc.), Advanced Process Control (APC), model-based process control, preventative operative maintenance, design optimization, updating of manufacturing parameters, feedback control, machine learning modification, or the like.

In some embodiments, the corrective action includes providing an alert (e.g., an alarm to stop or not perform the manufacturing process if the predictive data 168 indicates a predicted abnormality, such as an abnormality of the product, a component, or manufacturing equipment 124). In some embodiments, the corrective action includes providing feedback control (e.g., modifying a manufacturing parameter responsive to the predictive data 168 indicating a predicted abnormality). In some embodiments, the corrective action includes providing machine learning (e.g., modifying one or more manufacturing parameters based on the predictive data 168). In some embodiments, performance of the corrective action includes causing updates to one or more manufacturing parameters.

Manufacturing parameters may include hardware parameters (e.g., replacing components, using certain components, replacing a processing chip, updating firmware, etc.) and/or process parameters (e.g., temperature, pressure, flow, rate, electrical current, voltage, gas flow, lift speed, etc.). In some embodiments, the corrective action includes causing preventative operative maintenance (e.g., replace, process, clean, etc. components of the manufacturing equipment 124). In some embodiments, the corrective action includes causing design optimization (e.g., updating manufacturing parameters, manufacturing processes, manufacturing equipment 124, etc. for an optimized product). In some embodiments, the corrective action includes a updating a recipe (e.g., manufacturing equipment 124 to be in an idle mode, a sleep mode, a warm-up mode, etc.).

The predictive server 112, server machine 170, and server machine 180 may each include one or more computing devices such as a rackmount server, a router computer, a server computer, a personal computer, a mainframe computer, a laptop computer, a tablet computer, a desktop computer, Graphics Processing Unit (GPU), accelerator Application-Specific Integrated Circuit (ASIC) (e.g., Tensor Processing Unit (TPU)), etc.

The predictive server 112 may include a predictive component 114. In some embodiments, the predictive component 114 may receive current trace data 154 (e.g., receive from the client device 120, retrieve from the data store 140) and generate output (e.g., predictive data 168) for performing corrective action associated with the manufacturing equipment 124 based on the current trace data 154. In some embodiments, the predictive component 114 may use one or more trained machine learning models 190 to determine the output for performing the corrective action based on the current trace data 154.

In some embodiments, the predictive component 114 receives current trace data 154, performs signal processing to break down the current trace data 154 into sets of current component data 156 mapped to current component identifiers 158, provides the sets of current component data 156 and the current component identifiers 158 as input to a trained machine learning model 190B, and obtains outputs indicative of predictive data 168 from the trained machine learning model 190B.

In some embodiments, the predictive component 114 receives current trace data 154, performs signal processing by providing the current trace data 154 to a trained machine learning model 190A, receives the sets of current component data 156 mapped to current component identifiers 158 from the trained machine learning model 190A, provides the sets of current component data 156 and the current component identifiers 158 as input to a trained machine learning model 190B, and obtains outputs indicative of predictive data 168 from the trained machine learning model 190B.

In some embodiments the trained machine learning model 190A and the trained machine learning model 190B may be separate models. In some embodiments, the trained machine learning model 190A and the trained machine learning model may be the same model 190 (e.g., an ensemble model). The predictive component 114 may receive current trace data 154, provide the current trace data 154 to a trained machine learning model 190 (e.g., an ensemble model), and obtain outputs indicative of predictive data 168 from the trained machine learning model 190.

Trained machine learning model 190A may be trained using historical trace data 146 and library data 166 (e.g., indicative of mappings of historical component data 148 to historical component identifiers 150). Trained machine learning model 190B may be trained using library data 166 (e.g., sets of historical component data 148 and historical component identifiers 150) and historical performance data 162. A combined trained machine learning model 190 may be trained using historical trace data 146 and historical performance data 162.

Data store 140 may be a memory (e.g., random access memory), a drive (e.g., a hard drive, a flash drive), a database system, or another type of component or device capable of storing data. Data store 140 may include multiple storage components (e.g., multiple drives or multiple databases) that may span multiple computing devices (e.g., multiple server computers). The data store 140 may store sensor data 142, performance data 160, library data 166, and predictive data 168. Sensor data 142 may include historical sensor data 144 and current sensor data 152. Historical sensor data may include historical trace data 146, sets of historical component data 148, and historical component identifiers 150. Current sensor data 152 may include current trace data 154, sets of current component data 156, and current component identifiers 158. Performance data 160 may include historical performance data 162 and current performance data 164. The historical sensor data 144 and historical performance data 162 may be historical data (e.g., at least a portion for training the machine learning models 190). The current sensor data 144 may be current data (e.g., at least a portion to be input into the trained machine learning models 190, subsequent to the historical data) for which predictive data 168 is to be generated (e.g., for performing corrective actions). The current performance data 164 may also be current data (e.g., for re-training the trained machine learning model).

In some embodiments, predictive system 110 further includes server machine 170 and server machine 180. Server machine 170 includes a data set generator 172 that is capable of generating data sets (e.g., a set of data inputs and a set of target outputs) to train, validate, and/or test a machine learning model(s) 190. Some operations of data set generator 172 are described in detail below with respect to FIGS. 2A-C and 4A. In some embodiments, the data set generator 172 may partition the historical data (e.g., historical sensor data 144, library data 166, historical performance data 162) into a training set (e.g., sixty percent of the historical data), a validating set (e.g., twenty percent of the historical data), and a testing set (e.g., twenty percent of the historical data). In some embodiments, the predictive system 110 (e.g., via predictive component 114) generates multiple sets of features. For example a first set of features may correspond to a first set of types of sensor data (e.g., from a first set of sensors, first combination of values from first set of sensors, first patterns in the values from the first set of sensors) that correspond to each of the data sets (e.g., training set, validation set, and testing set) and a second set of features may correspond to a second set of types of sensor data (e.g., from a second set of sensors different from the first set of sensors, second combination of values different from the first combination, second patterns different from the first patterns) that correspond to each of the data sets.

Server machine 180 includes a training engine 182, a validation engine 184, selection engine 185, and/or a testing engine 186. An engine (e.g., training engine 182, a validation engine 184, selection engine 185, and a testing engine 186) may refer to hardware (e.g., circuitry, dedicated logic, programmable logic, microcode, processing device, etc.), software (such as instructions run on a processing device, a general purpose computer system, or a dedicated machine), firmware, microcode, or a combination thereof. The training engine 182 may be capable of training a machine learning model 190 using one or more sets of features associated with the training set from data set generator 172. The training engine 182 may generate multiple trained machine learning models 190, where each trained machine learning model 190 corresponds to a distinct set of features of the training set (e.g., sensor data from a distinct set of sensors). For example, a first trained machine learning model may have been trained using all features (e.g., X1-X5), a second trained machine learning model may have been trained using a first subset of the features (e.g., X1, X2, X4), and a third trained machine learning model may have been trained using a second subset of the features (e.g., X1, X3, X4, and X5) that may partially overlap the first subset of features.

The validation engine 184 may be capable of validating a trained machine learning model 190 using a corresponding set of features of the validation set from data set generator 172. For example, a first trained machine learning model 190 that was trained using a first set of features of the training set may be validated using the first set of features of the validation set. The validation engine 184 may determine an accuracy of each of the trained machine learning models 190 based on the corresponding sets of features of the validation set. The validation engine 184 may discard trained machine learning models 190 that have an accuracy that does not meet a threshold accuracy. In some embodiments, the selection engine 185 may be capable of selecting one or more trained machine learning models 190 that have an accuracy that meets a threshold accuracy. In some embodiments, the selection engine 185 may be capable of selecting the trained machine learning model 190 that has the highest accuracy of the trained machine learning models 190.

The testing engine 186 may be capable of testing a trained machine learning model 190 using a corresponding set of features of a testing set from data set generator 172. For example, a first trained machine learning model 190 that was trained using a first set of features of the training set may be tested using the first set of features of the testing set. The testing engine 186 may determine a trained machine learning model 190 that has the highest accuracy of all of the trained machine learning models based on the testing sets.

The machine learning model 190 may refer to the model artifact that is created by the training engine 182 using a training set that includes data inputs and corresponding target outputs (correct answers for respective training inputs). Patterns in the data sets can be found that map the data input to the target output (the correct answer), and the machine learning model 190 is provided mappings that captures these patterns. The machine learning model 190 may use one or more of Support Vector Machine (SVM), Radial Basis Function (RBF), clustering, supervised machine learning, semi-supervised machine learning, unsupervised machine learning, k-Nearest Neighbor algorithm (k-NN), linear regression, random forest, neural network (e.g., artificial neural network), etc.

Predictive component 114 may provide current sensor data 152 to the trained machine learning model 190 and may run the trained machine learning model 190 on the input to obtain one or more outputs. The predictive component 114 may be capable of determining (e.g., extracting) predictive data 168 from the output of the trained machine learning model 190 and may determine (e.g., extract) confidence data from the output that indicates a level of confidence that the predictive data 168 corresponds to the library data 166 (e.g., for model 190A, that the component data corresponds to the component identifier) or current performance data 164 (e.g., model 190B) for products produced or to be produced using the manufacturing equipment 124 at the current sensor data 152. The predictive component 114 or corrective action component 122 may use the confidence data to decide whether to cause a corrective action associated with the manufacturing equipment 124 based on the predictive data 168.

The confidence data may include or indicate a level of confidence that the predictive data 168 corresponds to library data 166 (e.g., for model 190A) or current performance data 164 (e.g., model 190B) for products associated with at least a portion of the current trace data 154. In one example, the level of confidence is a real number between 0 and 1 inclusive, where 0 indicates no confidence that the predictive data 168 corresponds to library data 166 or current performance data 164 associated with the current trace data 154 and 1 indicates absolute confidence that the predictive data 168 corresponds to library data 166 or current performance data 164 associated with the current trace data 154. In some embodiments, the system 100 may use predictive system 110 to determine predictive data 168 instead of using the metrology equipment 128 to determine current performance data 164. In some embodiments, responsive to the confidence data indicating a level of confidence that is below a threshold level, the system 100 may cause the metrology equipment 128 to generate the current performance data 164. Responsive to the confidence data indicating a level of confidence below a threshold level for a predetermined number of instances (e.g., percentage of instances, frequency of instances, total number of instances, etc.) the predictive component 114 may cause the trained machine learning model 190 to be re-trained (e.g., based on the current trace data 154 and current performance data 164, etc.).

For purpose of illustration, rather than limitation, aspects of the disclosure describe the training of one or more machine learning models 190 using historical data (e.g., historical trace data 146, historical component data 148, historical component identifiers 150, and library data 166) and inputting current data (e.g., current trace data 154, current component data 156, and current component identifiers 158) into the one or more trained machine learning models 190 to determine predictive data 168 (e.g., library data 166, current performance data 164). In other implementations, a heuristic model or rule-based model is used to determine predictive data 168 (e.g., without using a trained machine learning model). Predictive component 114 may monitor historical sensor data 144 and historical performance data 162. Any of the information described with respect to data inputs 210 of FIGS. 2A-C may be monitored or otherwise used in the heuristic or rule-based model.

In some embodiments, the functions of client device 120, predictive server 112, server machine 170, and server machine 180 may be provided by a fewer number of machines. For example, in some embodiments server machines 170 and 180 may be integrated into a single machine, while in some other embodiments, server machine 170, server machine 180, and predictive server 112 may be integrated into a single machine. In some embodiments, client device 120 and predictive server 112 may be integrated into a single machine.

In general, functions described in one embodiment as being performed by client device 120, predictive server 112, server machine 170, and server machine 180 can also be performed on predictive server 112 in other embodiments, if appropriate. In addition, the functionality attributed to a particular component can be performed by different or multiple components operating together. For example, in some embodiments, the predictive server 112 may determine the corrective action based on the predictive data 168. In another example, client device 120 may determine the predictive data 168 based on output from the trained machine learning model.

In addition, the functions of a particular component can be performed by different or multiple components operating together. One or more of the predictive server 112, server machine 170, or server machine 180 may be accessed as a service provided to other systems or devices through appropriate application programming interfaces (API).

In embodiments, a "user" may be represented as a single individual. However, other embodiments of the disclosure encompass a "user" being an entity controlled by a plurality of users and/or an automated source. For example, a set of individual users federated as a group of administrators may be considered a "user."

Embodiments of the disclosure may be applied to data quality evaluation, feature enhancement, model evaluation, Virtual Metrology (VM), Predictive Maintenance (PdM), limit optimization, or the like.

Although embodiments of the disclosure are discussed in terms of generating predictive data 168 to perform a corrective action in manufacturing facilities (e.g., semiconductor manufacturing facilities), embodiments may also be generally applied to characterizing and monitoring components. Embodiments may be generally applied to characterizing and monitoring based on different types of data.

Figure 2A:
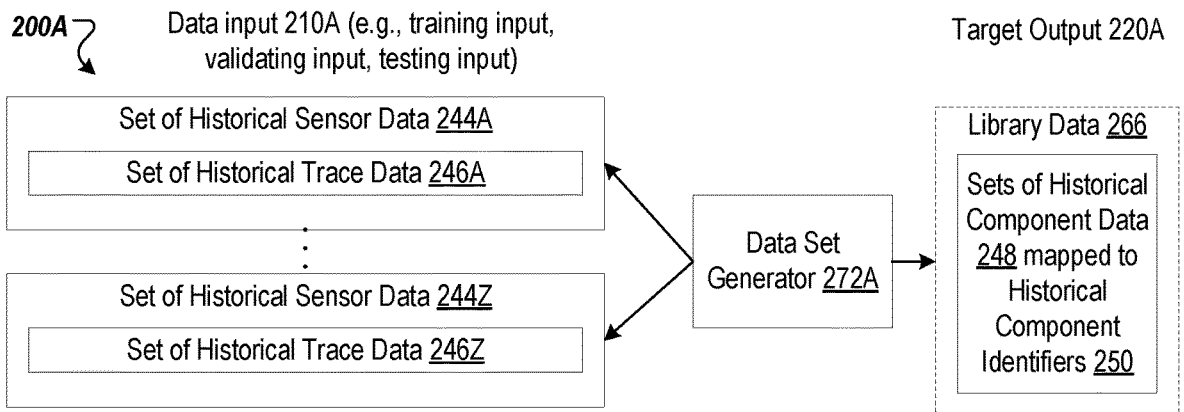
FIGS. 2A-C are one or more example data set generators to create data sets for one or more machine learning models, according to certain embodiments.
Figure 2B:
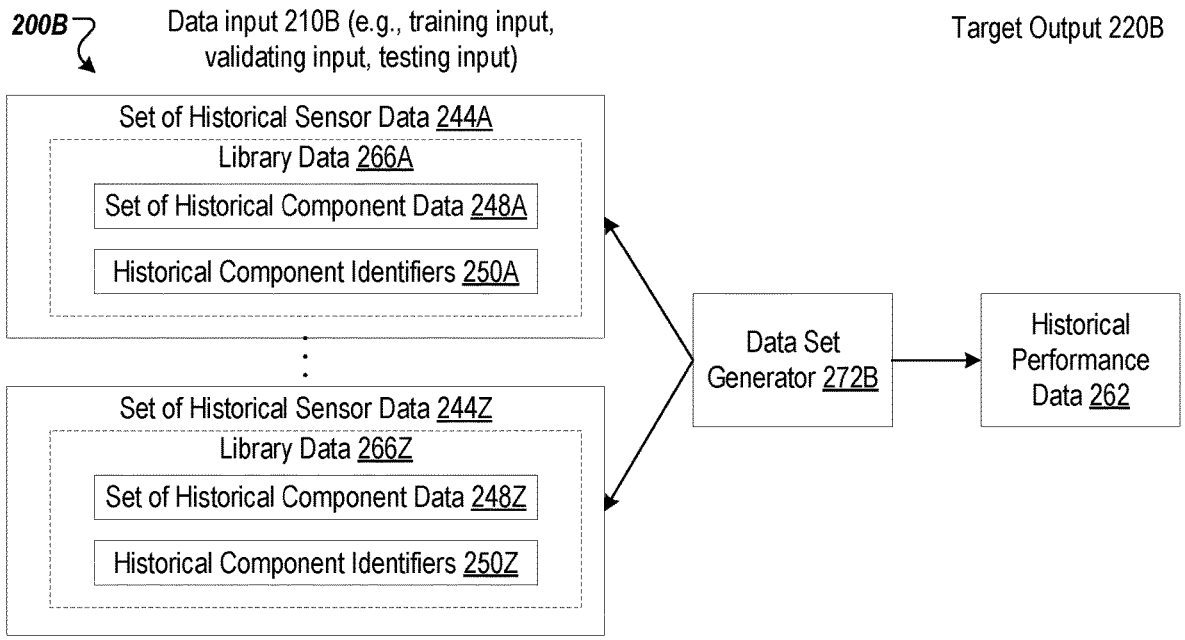
Figure 2C:
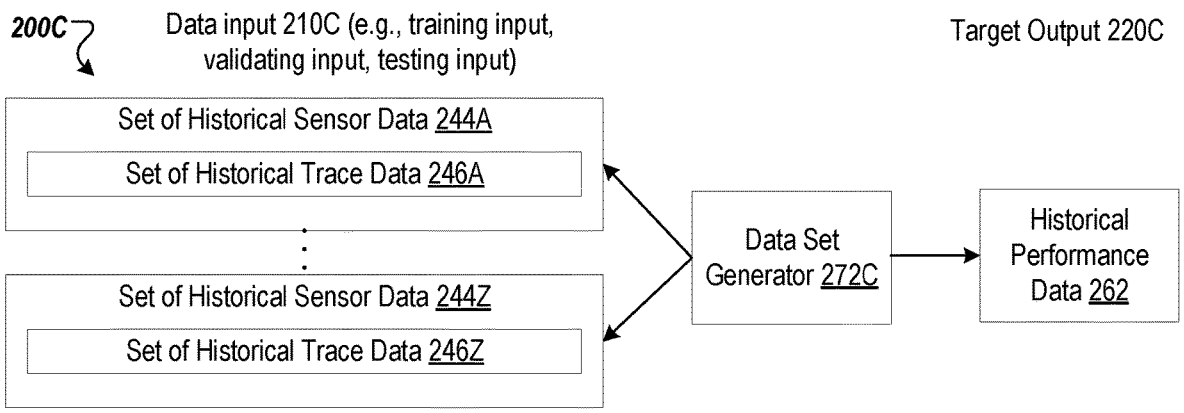

FIGS. 2A-C are one or more example data set generators 272 (e.g., data set generator 172 of FIG. 1) to create data sets for a machine learning model (e.g., model 190 of FIG. 1), according to certain embodiments. Each data set generator 272 may be part of server machine 170 of FIG. 1. In some embodiments, data set generator 272 from two or more of FIGS. 2A-C are the same data set generator. In some embodiments, data set generator from each of FIGS. 2A-C is a separate data set generator.

Referring to FIG. 2A, data set generator 272A (e.g., data set generator 172 of FIG. 1) creates data sets for a machine learning model (e.g., model 190A of FIG. 1). Data set generator 272A may create data sets using historical sensor data 244 (e.g., historical sensor data 144 of FIG. 1) and library data 266 (e.g., library data 166 of FIG. 1). The historical sensor data 242 may include historical trace data 246 (e.g., historical trace data 146 of FIG. 1). Library data 266 may include sets of historical component data 248 (e.g., sets of historical component data 148 of FIG. 1) mapped to historical component identifiers 250 (e.g., historical component identifiers 150 of FIG. 1). System 200A of FIG. 2A shows data set generator 272A, data inputs 210A, and target output 220A.

Referring to FIG. 2B, data set generator 272B (e.g., data set generator 172 of FIG. 1) creates data sets for a machine learning model (e.g., model 190B of FIG. 1). Data set generator 272B may create data sets using library data 266 (e.g., library data 166 of FIG. 1) and historical performance data 262 (e.g., historical performance data 162 of FIG. 1). Library data 266 may include sets of historical component data 248 (e.g., sets of historical component data 148 of FIG. 1) mapped to historical component identifiers 250 (e.g., historical component identifiers 150 of FIG. 1). System 200B of FIG. 2B shows data set generator 272B, data inputs 210B, and target output 220B.

Referring to FIG. 2C, data set generator 272C (e.g., data set generator 172 of FIG. 1) creates data sets for a machine learning model (e.g., combination of models 190A-B of FIG. 1). Data set generator 272C may create data sets using historical sensor data 244 (e.g., historical sensor data 144 of FIG. 1) and historical performance data 262 (e.g., historical performance data 162 of FIG. 1). The historical sensor data 242 may include historical trace data 246 (e.g., historical trace data 146 of FIG. 1). System 200C of FIG. 2C shows data set generator 272C, data inputs 210C, and target output 220C.

Referring to FIGS. 2A-C, in some embodiments, data set generator 272 generates a data set (e.g., training set, validating set, testing set) that includes one or more data inputs 210 (e.g., training input, validating input, testing input) and one or more target outputs 220 that correspond to the data inputs 210. The data set may also include mapping data that maps the data inputs 210 to the target outputs 220. Data inputs 210 may also be referred to as "features," "attributes," or information." In some embodiments, data set generator 272 may provide the data set to the training engine 182, validating engine 184, or testing engine 186, where the data set is used to train, validate, or test the machine learning model 190. Some embodiments of generating a training set may further be described with respect to FIG. 4A.

In some embodiments, data set generator 272 generates the data input 210 and target output 220. In some embodiments, data inputs 210 may include one or more sets of historical sensor data 244. Each instance of historical sensor data 244 may include one or more of sensor data from one or more types of sensors, combination of sensor data from one or more types of sensors, patterns from sensor data from one or more types of sensors, etc.

In some embodiments, data set generator 272 may generate a first data input corresponding to a first set of historical sensor data 244A to train, validate, or test a first machine learning model and the data set generator 272 may generate a second data input corresponding to a second set of historical sensor data 244B to train, validate, or test a second machine learning model.

In some embodiments, the data set generator 272 may discretize (e.g., segment) one or more of the data input 210 or the target output 220 (e.g., to use in classification algorithms for regression problems). Discretization (e.g., segmentation via a sliding window) of the data input 210 or target output 220 may transform continuous values of variables into discrete values. In some embodiments, the discrete values for the data input 210 indicate discrete historical sensor data 244 to obtain a target output 220 (e.g., discrete library data 266 or performance data 262).

Data inputs 210 and target outputs 220 to train, validate, or test a machine learning model may include information for a particular facility (e.g., for a particular semiconductor manufacturing facility). For example, the historical sensor data 244 and library data 266 may be for the same manufacturing facility. In another example, historical sensor data 244 and historical performance data 262 may be for the same manufacturing facility.

In some embodiments, the information used to train the machine learning model may be from specific types of manufacturing equipment 124 of the manufacturing facility having specific characteristics and allow the trained machine learning model to determine outcomes for a specific group of manufacturing equipment 124 based on input for current sensor data (e.g., current trace data 154) associated with one or more components sharing characteristics of the specific group. In some embodiments, the information used to train the machine learning model may be for components from two or more manufacturing facilities and may allow the trained machine learning model to determine outcomes for components based on input from one manufacturing facility.

In some embodiments, subsequent to generating a data set and training, validating, or testing a machine learning model 190 using the data set, the machine learning model 190 may be further trained, validated, or tested (e.g., library data 166 of FIG. 1 or current performance data 164 of FIG. 1) or adjusted (e.g., adjusting weights associated with input data of the machine learning model 190, such as connection weights in a neural network).

Figure 3:
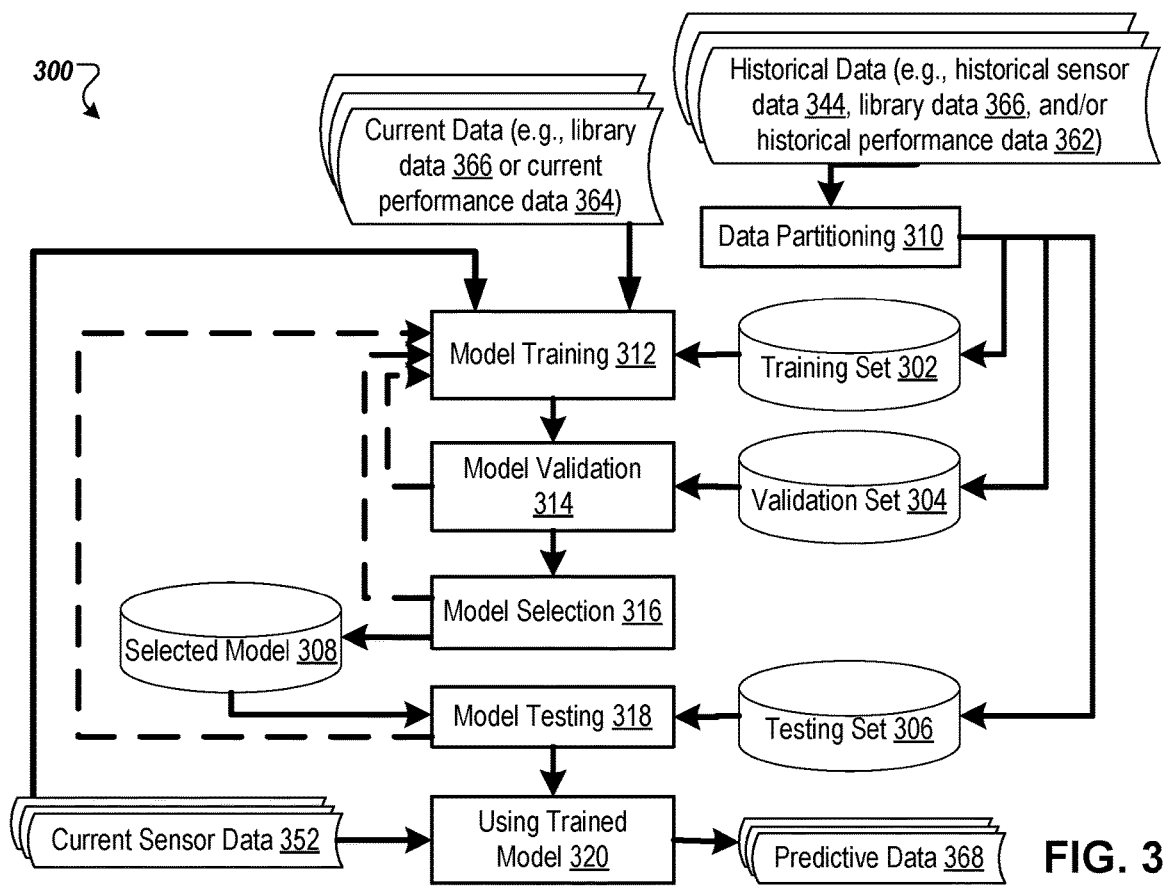
FIG. 3 is a block diagram illustrating determining predictive data, according to certain embodiments.

FIG. 3 is a block diagram illustrating a system 300 for generating predictive data 368 (e.g., predictive data 168 of FIG. 1), according to certain embodiments. The system 300 may be used to perform signal processing based on predictive data 368 (e.g., model 190A of FIG. 1) and/or to determine a corrective action associated with manufacturing equipment 124 based on the predictive data 368 (e.g., model 190B of FIG. 1).

At block 310, the system 300 (e.g., predictive system 110 of FIG. 1) performs data partitioning (e.g., via data set generator 172 of server machine 170 of FIG. 1) of the historical data (e.g., historical sensor data and library data 366 for model 190A of FIG. 1, library data 366 and historical performance data 362 for model 190B of FIG. 1, historical sensor data 344 and historical performance data 362 for a combination of models 190A-B of FIG. 1) to generate the training set 302, validation set 304, and testing set 306. For example, the training set may be 60% of the historical data, the validation set may be 20% of the historical data, and the testing set may be 20% of the historical data. The system 300 may generate a plurality of sets of features for each of the training set, the validation set, and the testing set. For example, if the historical data includes features derived from sensor data from 20 sensors (e.g., sensors 126 of FIG. 1) and 100 products (e.g., products that each correspond to the sensor data from the 20 sensors), a first set of features may be sensors 1-10, a second set of features may be sensors 11-20, the training set may be products 1-60, the validation set may be products 61-80, and the testing set may be products 81-100. In this example, the first set of features of the training set would be sensor data from sensors 1-10 for products 1-60.

At block 312, the system 300 performs model training (e.g., via training engine 182 of FIG. 1) using the training set 302. The system 300 may train multiple models using multiple sets of features of the training set 302 (e.g., a first set of features of the training set 302, a second set of features of the training set 302, etc.). For example, system 300 may train a machine learning model to generate a first trained machine learning model using the first set of features in the training set (e.g., sensor data from sensors 1-10 for products 1-60) and to generate a second trained machine learning model using the second set of features in the training set (e.g., sensor data from sensors 11-20 for products 1-60). In some embodiments, the first trained machine learning model and the second trained machine learning model may be combined to generate a third trained machine learning model (e.g., which may be a better predictor than the first or the second trained machine learning model on its own). In some embodiments, sets of features used in comparing models may overlap (e.g., first set of features being sensor data from sensors 1-15 and second set of features being sensors 5-20). In some embodiments, hundreds of models may be generated including models with various permutations of features and combinations of models.

At block 314, the system 300 performs model validation (e.g., via validation engine 184 of FIG. 1) using the validation set 304. The system 300 may validate each of the trained models using a corresponding set of features of the validation set 304. For example, system 300 may validate the first trained machine learning model using the first set of features in the validation set (e.g., sensor data from sensors 1-10 for products 61-80) and the second trained machine learning model using the second set of features in the validation set (e.g., sensor data from sensors 11-20 for products 61-80). In some embodiments, the system 300 may validate hundreds of models (e.g., models with various permutations of features, combinations of models, etc.) generated at block 312. At block 314, the system 300 may determine an accuracy of each of the one or more trained models (e.g., via model validation) and may determine whether one or more of the trained models has an accuracy that meets a threshold accuracy. Responsive to determining that none of the trained models has an accuracy that meets a threshold accuracy, flow returns to block 312 where the system 300 performs model training using different sets of features of the training set. Responsive to determining that one or more of the trained models has an accuracy that meets a threshold accuracy, flow continues to block 316. The system 300 may discard the trained machine learning models that have an accuracy that is below the threshold accuracy (e.g., based on the validation set).

At block 316, the system 300 performs model selection (e.g., via selection engine 185 of FIG. 1) to determine which of the one or more trained models that meet the threshold accuracy has the highest accuracy (e.g., the selected model 308, based on the validating of block 314). Responsive to determining that two or more of the trained models that meet the threshold accuracy have the same accuracy, flow may return to block 312 where the system 300 performs model training using further refined training sets corresponding to further refined sets of features for determining a trained model that has the highest accuracy.

At block 318, the system 300 performs model testing (e.g., via testing engine 186 of FIG. 1) using the testing set 306 to test the selected model 308. The system 300 may test, using the first set of features in the testing set (e.g., sensor data from sensors 1-10 for products 81-100), the first trained machine learning model to determine the first trained machine learning model meets a threshold accuracy (e.g., based on the first set of features of the testing set 306). Responsive to accuracy of the selected model 308 not meeting the threshold accuracy (e.g., the selected model 308 is overly fit to the training set 302 and/or validation set 304 and is not applicable to other data sets such as the testing set 306), flow continues to block 312 where the system 300 performs model training (e.g., retraining) using different training sets corresponding to different sets of features (e.g., sensor data from different sensors). Responsive to determining that the selected model 308 has an accuracy that meets a threshold accuracy based on the testing set 306, flow continues to block 320. In at least block 312, the model may learn patterns in the historical data to make predictions and in block 318, the system 300 may apply the model on the remaining data (e.g., testing set 306) to test the predictions.

At block 320, system 300 uses the trained model (e.g., selected model 308) to receive current sensor data 352 (e.g., current sensor data 152 of FIG. 1) and determines (e.g., extracts), from the output of the trained model, predictive data 368 (e.g., predictive data 168 of FIG. 1) to perform signal processing (e.g., generate sets of current component data 156 mapped to current component identifiers 158) or to perform corrective actions associated with the manufacturing equipment 124. In some embodiments, the current sensor data 352 may correspond to the same types of features in the historical sensor data. In some embodiments, the current sensor data 352 corresponds to a same type of features as a subset of the types of features in historical sensor data that are used to train the selected model 308.

In some embodiments, current data is received. Current data may include library data 366 (e.g., library data 166 of FIG. 1) or current performance data 364 (e.g., current performance data 164 of FIG. 1). The current data may be received from metrology equipment (e.g., metrology equipment 128 of FIG. 1) or via user input. The model 308 is re-trained based on the current data. In some embodiments, a new model is trained based on the current data and the current sensor data 352.

In some embodiments, one or more of the acts 310-320 may occur in various orders and/or with other acts not presented and described herein. In some embodiments, one or more of acts 310-320 may not be performed. For example, in some embodiments, one or more of data partitioning of block 310, model validation of block 314, model selection of block 316, or model testing of block 318 may not be performed.

FIGS. 4A-E are flow diagrams of methods 400A-E associated with generating predictive data to cause a corrective action, according to certain embodiments. Methods 400A-E may be performed by processing logic that may include hardware (e.g., circuitry, dedicated logic, programmable logic, microcode, processing device, etc.), software (such as instructions run on a processing device, a general purpose computer system, or a dedicated machine), firmware, microcode, or a combination thereof. In some embodiment, methods 400A-E may be performed, in part, by predictive system 110. Method 400A may be performed, in part, by predictive system 110 (e.g., server machine 170 and data set generator 172 of FIG. 1, data set generator 272 of 2A-C). Predictive system 110 may use method 400A to generate a data set to at least one of train, validate, or test a machine learning model, in accordance with embodiments of the disclosure. Methods 400B-C may be performed by server machine 180 (e.g., training engine 182, etc.). Methods 400D-E may be performed by predictive server 112 (e.g., predictive component 114). In some embodiments, a non-transitory storage medium stores instructions that when executed by a processing device (e.g., of predictive system 110, of server machine 180, of predictive server 112, etc.) cause the processing device to perform one or more of methods 400A-E.

For simplicity of explanation, methods 400A-E are depicted and described as a series of operations. However, operations in accordance with this disclosure can occur in various orders and/or concurrently and with other operations not presented and described herein. Furthermore, not all illustrated operations may be performed to implement methods 400A-E in accordance with the disclosed subject matter. In addition, those skilled in the art will understand and appreciate that methods 400A-E could alternatively be represented as a series of interrelated states via a state diagram or events.

Figure 4A:
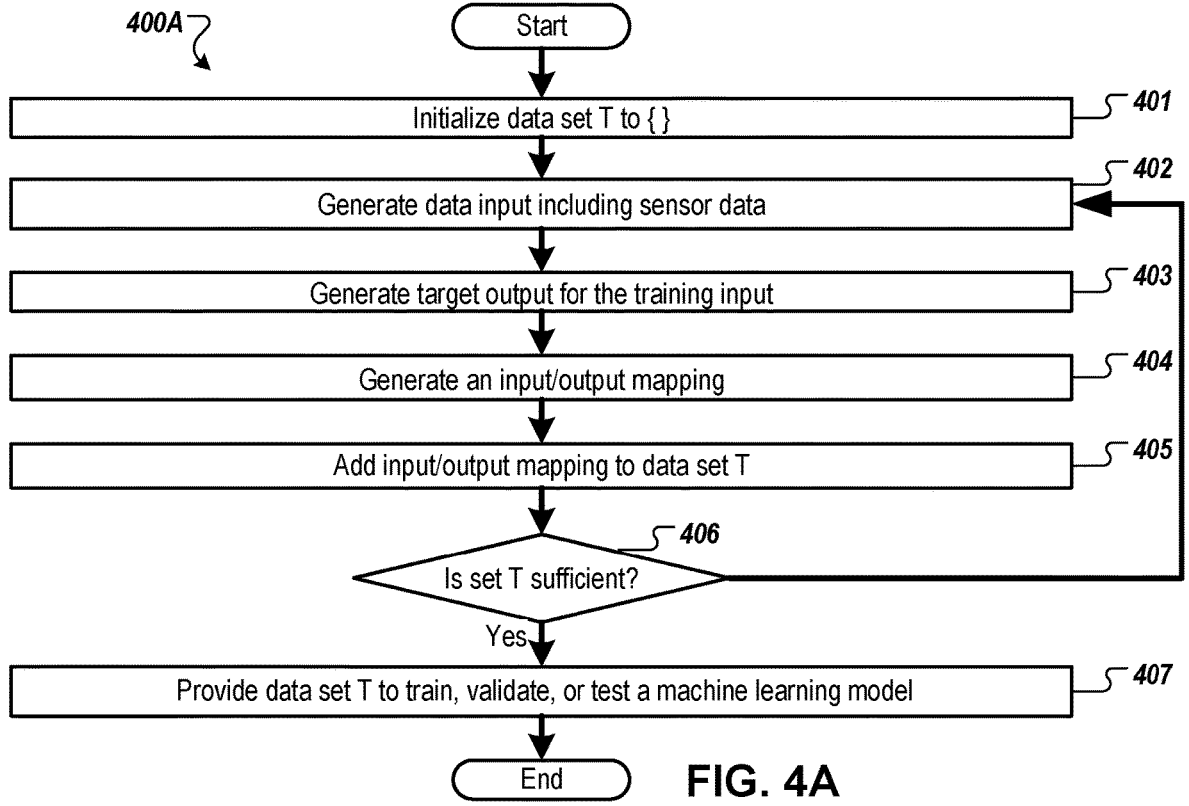
FIGS. 4A-E are flow diagrams of methods associated with generating predictive data to cause a corrective action, according to certain embodiments.

FIG. 4A is a flow diagram of a method 400A for generating a data set for a machine learning model for generating predictive data (e.g., predictive data 168 of FIG. 1), according to certain embodiments.

Referring to FIG. 4A, in some embodiments, at block 401 the processing logic implementing method 400A initializes a training set T to an empty set.

At block 402, processing logic generates first data input (e.g., first training input, first validating input) that includes sensor data (e.g., historical sensor data 144 of FIG. 1, historical sensor data 244 of FIGS. 2A-C). In some embodiments, the first data input may include a first set of features for types of sensor data and a second data input may include a second set of features for types of sensor data (e.g., as described with respect to FIG. 2A-C).

At block 403, processing logic generates a first target output for one or more of the data inputs (e.g., first data input). In some embodiments, the first target output is library data 166 (e.g., sets of historical component data 148 mapped to historical component identifiers 150) (e.g., for model 190A). In some embodiments, the first target output is historical performance data 162 (e.g., for model 190B or a combination of models 190A-B, see FIGS. 2B-C).

At block 404, processing logic optionally generates mapping data that is indicative of an input/output mapping. The input/output mapping (or mapping data) may refer to the data input (e.g., one or more of the data inputs described herein), the target output for the data input (e.g., where the target output identifies library data 166 or historical performance data 162), and an association between the data input(s) and the target output.

At block 405, processing logic adds the mapping data generated at block 404 to data set T.

At block 406, processing logic branches based on whether data set T is sufficient for at least one of training, validating, and/or testing machine learning model 190. If so, execution proceeds to block 407, otherwise, execution continues back at block 402. It should be noted that in some embodiments, the sufficiency of data set T may be determined based simply on the number of input/output mappings in the data set, while in some other implementations, the sufficiency of data set T may be determined based on one or more other criteria (e.g., a measure of diversity of the data examples, accuracy, etc.) in addition to, or instead of, the number of input/output mappings.

At block 407, processing logic provides data set T (e.g., to server machine 180) to train, validate, and/or test machine learning model 190. In some embodiments, data set T is a training set and is provided to training engine 182 of server machine 180 to perform the training. In some embodiments, data set T is a validation set and is provided to validation engine 184 of server machine 180 to perform the validating. In some embodiments, data set T is a testing set and is provided to testing engine 186 of server machine 180 to perform the testing. In the case of a neural network, for example, input values of a given input/output mapping (e.g., numerical values associated with data inputs 210) are input to the neural network, and output values (e.g., numerical values associated with target outputs 220) of the input/ output mapping are stored in the output nodes of the neural network. The connection weights in the neural network are then adjusted in accordance with a learning algorithm (e.g., back propagation, etc.), and the procedure is repeated for the other input/output mappings in data set T. After block 407, machine learning model (e.g., machine learning model 190) can be at least one of trained using training engine 182 of server machine 180, validated using validating engine 184 of server machine 180, or tested using testing engine 186 of server machine 180. The trained machine learning model may be implemented by predictive component 114 (of predictive server 112) to generate predictive data 168 for performing signal processing or for performing corrective action associated with the manufacturing equipment 124.

Figure 4B:
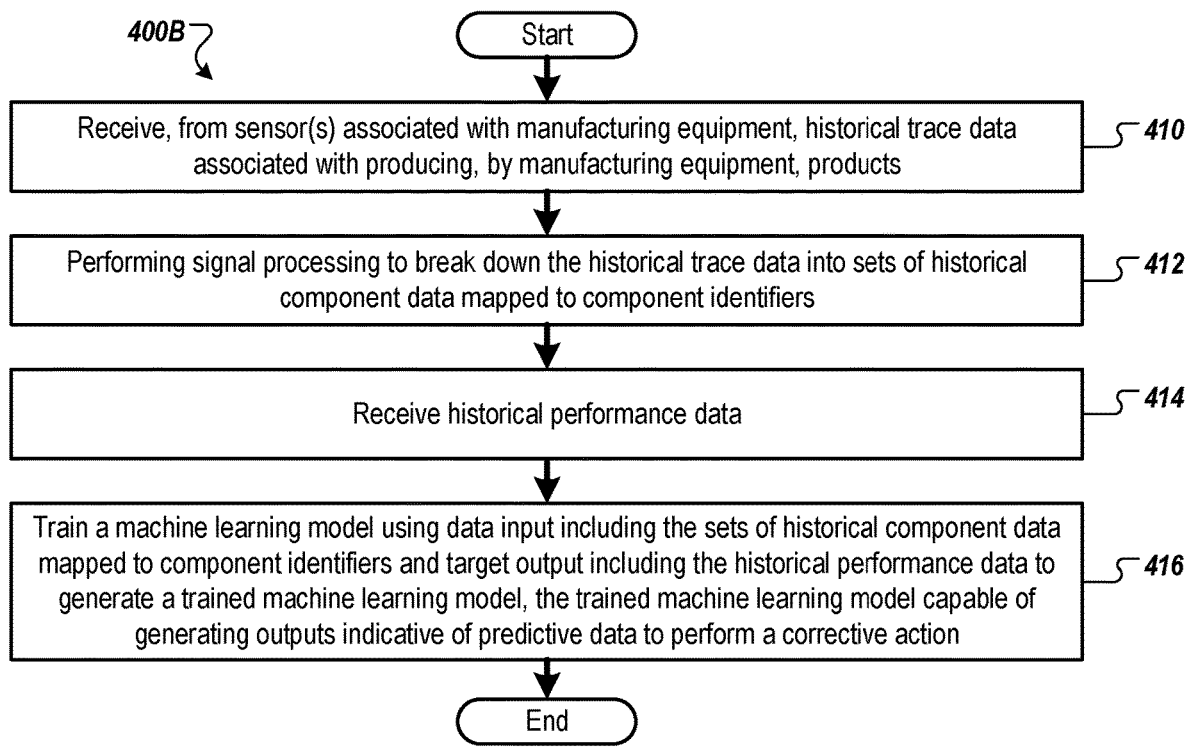

FIG. 4B is a method for training a machine learning model (e.g., model 190B of FIG. 1) for determining predictive data (e.g., predictive data 168 of FIG. 1) to perform a corrective action.

Referring to FIG. 4B, at block 410 of method 400B, the processing logic receives, from one or more sensors associated with manufacturing equipment, historical trace data associated with producing, by manufacturing equipment, products (e.g., wafers). The historical trace data may be electrical data including one or more of electrical current data or voltage data received by one or more sensors, such as one or more current clamps of an electrical device 127.

Figure 5:
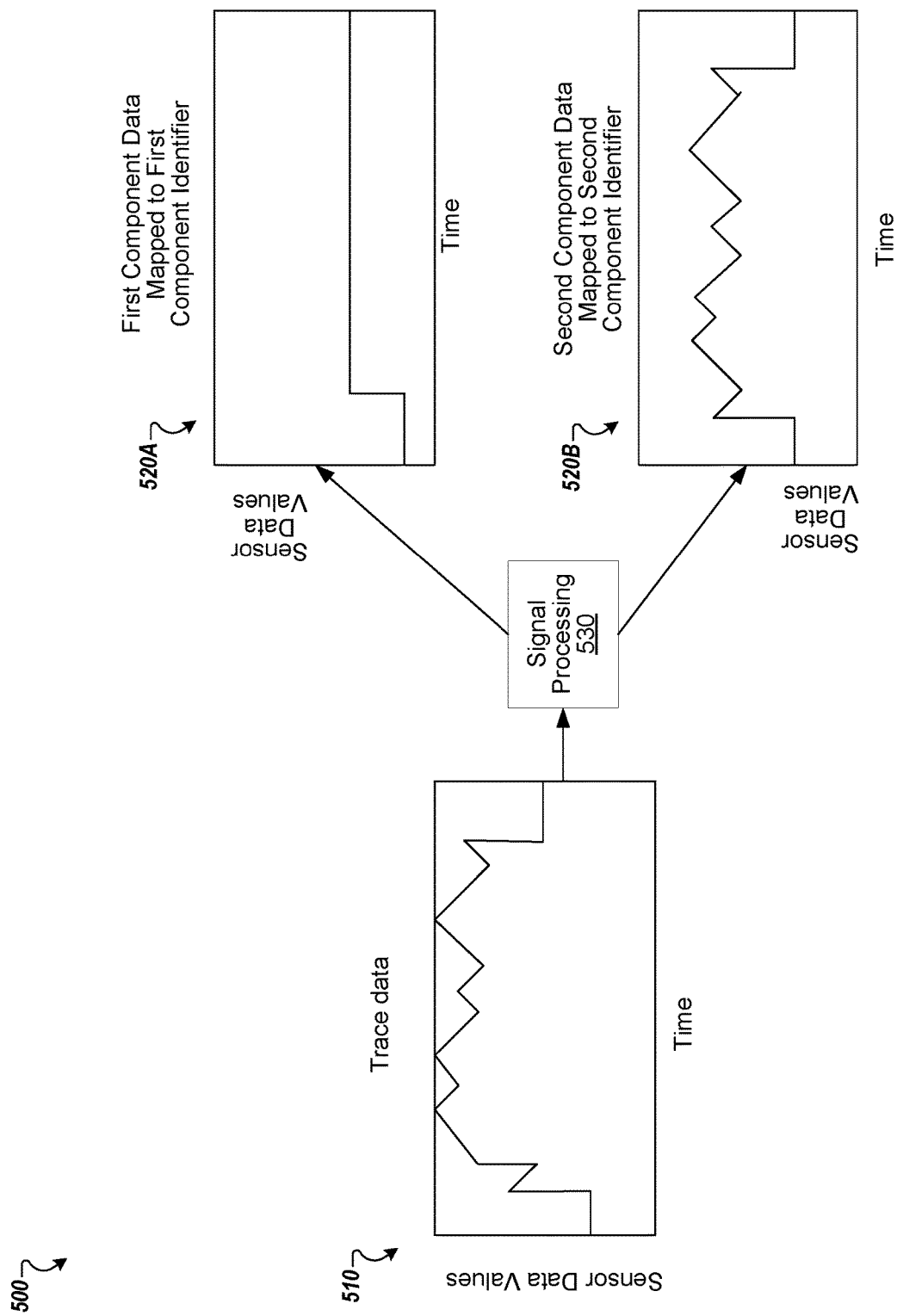
FIG. 5 is a block diagram associated with signal processing, according to certain embodiments.

At block 412, the processing logic performs signal processing to break down the historical trace data into sets of historical component data mapped to component identifiers (e.g., see FIG. 5). The historical trace data may include total sensor values (e.g., electrical current values, voltage values, etc.) over time. Each set of historical component data may be a portion of the historical trace data over time that corresponds to a specific component. Each component may be a part of the manufacturing equipment (e.g., of a semiconductor manufacturing system) that is powered electrically. Components may include one or more of a robot, a door opening device, a shutter garage, a slip valve, RF power controller, a lift, a heater, a valve, a plasma gun, a pump, motor, or the like. When two or more components are operating simultaneously, the historical trace data measured by the electrical device 127 may be a sum of each set of historical component data that corresponds to a respective component of the two or more components.

In some embodiments, the processing logic compares the historical trace data to a library (e.g., library data 166 of FIG. 1) to perform the signal processing to break down the historical trace data into sets of historical component data mapped to component identifiers. At least a portion of the library data 166 may be compiled at the time of one or more of manufacturing of the manufacturing equipment 124, commissioning of the manufacturing equipment 124, usage of the manufacturing equipment, or the like. Components (e.g., a first lift, a second lift, RF power, etc.) of the manufacturing equipment 124 may be operated one at a time to determine a corresponding set of component data that corresponds to each component. After a first set of component data is determined for a first component and a second set of component data is determined for a second component, first and second components may be operated at the same time to determine whether the processing logic can isolate the two sets of component data from each other. The sets of component data mapped to the component identifiers may be complied in the library.

The processing logic may determine a set of historical component data that is not in the library. The processing logic may cause a user device to display a prompt requesting user input identifying the component corresponding to the set of historical component data (e.g., a prompt asking what component started executing). The processing logic may cause the user device to display a prompt requesting user selection of a component form a list of possible component that correspond to the set of historical component data. The processing logic may cause the user device to display a prompt requesting user input to confirm a component (e.g., determined by the processing logic) corresponds to the set of component data. In some embodiments, each component may be caused to execute by itself or with other components for which corresponding sets of component data have been identified to be able to single out the set of component data (e.g., components are turned on and off until the processing logic determines component data corresponding to each component).

In some embodiments, the processing logic provides the historical trace data as input to a trained machine learning model (e.g., see block 424 of FIG. 2C) to perform the signal processing.

At block 414, the processing logic receives historical performance data. The historical performance data may correspond to historical trace data and/or historical component data mapped to corresponding components. The historical performance data may be associated with products (e.g., production of the products corresponds to the sets of historical component data) and/or manufacturing equipment (e.g., manufacturing equipment and/or components of the manufacturing equipment used for production of the products that correspond to sets of historical component data). The historical performance data may be indicative of quality of products (e.g., defective, not defective), energy usage, component failure, maintenance of the manufacturing equipment, or the like.

At block 416, the processing logic trains a machine learning model using data input including the sets of historical component data mapped to component identifiers and target output including the historical performance data to generate a trained machine learning model. The trained machine learning model may be capable of generating outputs indicative of predictive data to perform a corrective action (e.g., see blocks 444-448 of FIG. 4D). In some embodiments, the machine learning model is trained using sets of historical component data mapped to component identifiers for normal historical performance data (e.g., non-defective products). In some embodiments, the machine learning model is trained using normal and abnormal historical performance data (e.g., defective products and non-defective products).

Figure 4C:
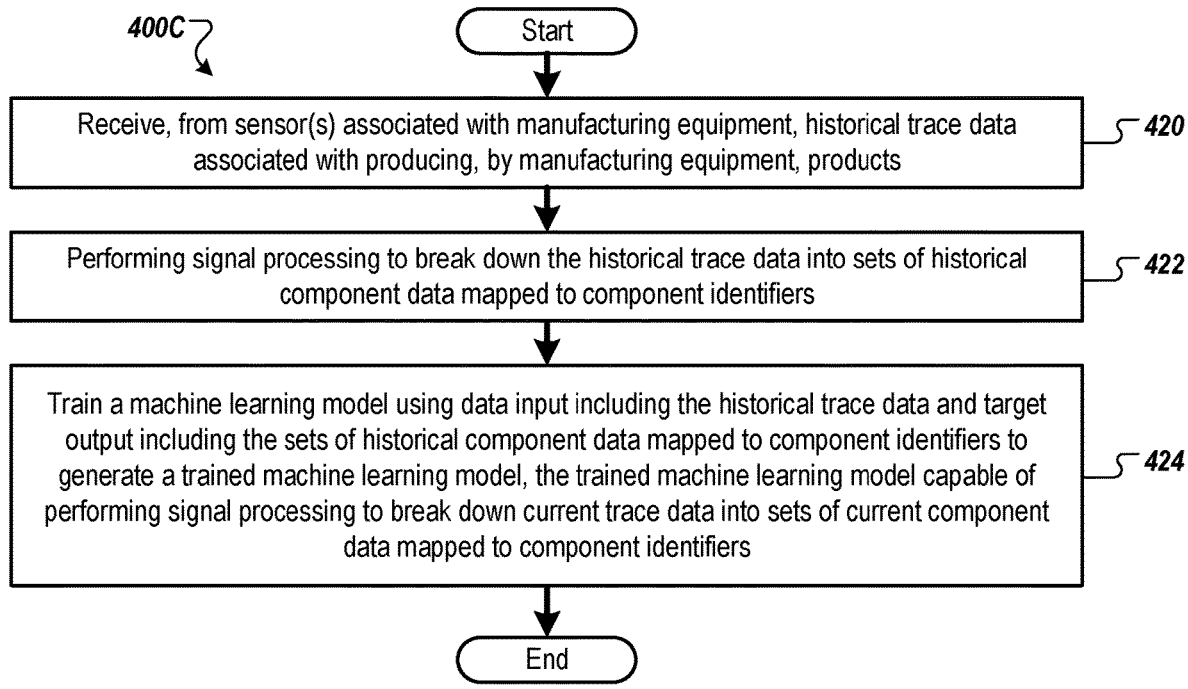

FIG. 4C is a method 400C for training a machine learning model (e.g., model 190A of FIG. 1) for performing signal processing.

Referring to FIG. 4C, at block 420 of method 400C, the processing logic receives, from one or more sensors associated with manufacturing equipment, historical trace data associated with producing, by manufacturing equipment, products. Block 420 may be similar to block 410 of FIG. 4B.

At block 422, the processing logic performs signal processing to break down the historical trace data into sets of historical component data mapped to component identifiers. Block 422 may be similar to block 412 of FIG. 4B.

At block 424, the processing logic trains a machine learning model using data input including the historical trace data and target output including the sets of historical component data mapped to component identifiers to generate a trained machine learning model. The trained machine learning model may be capable of performing signal processing to break down current trace data into sets of current component data mapped to component identifiers (see block 442 of FIG. 4D, see FIG. 4E).

Figure 4D:
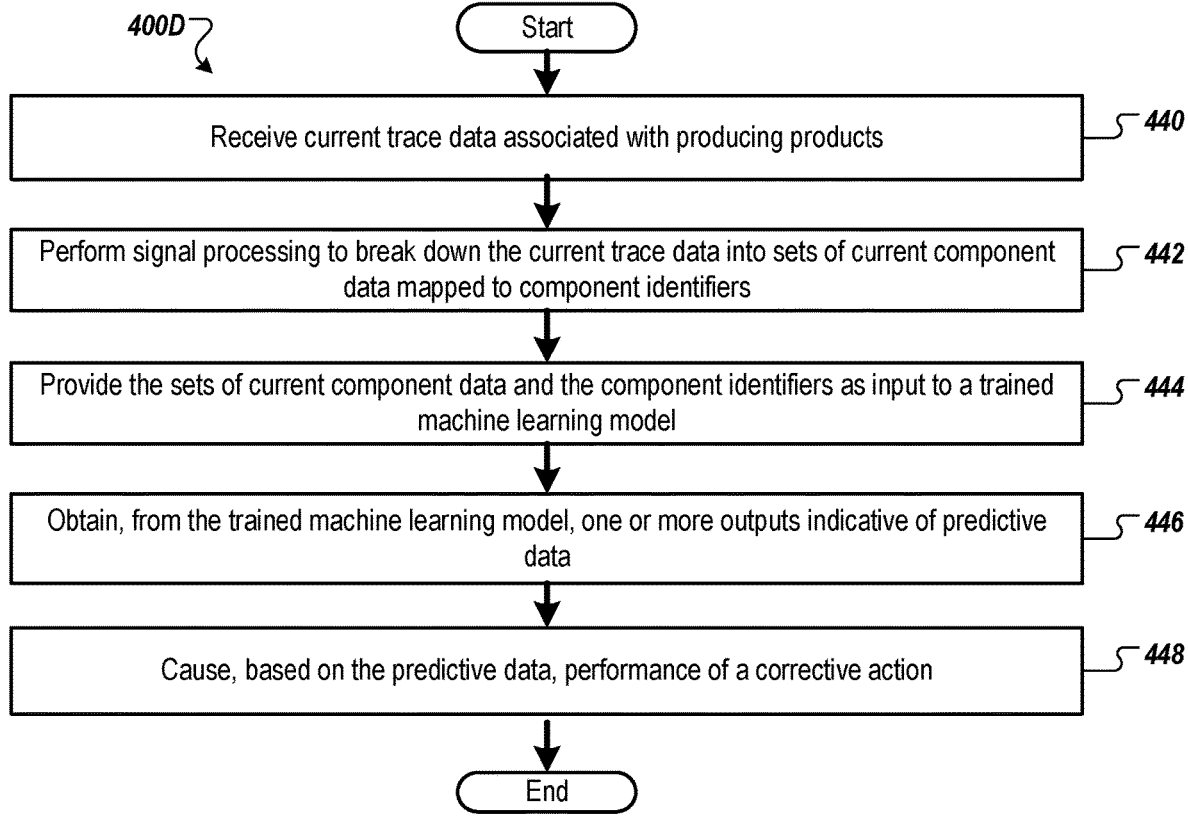

FIG. 4D is a method 400D for using a trained machine learning model (e.g., model 190B of FIG. 1) for determining predictive data to cause performance of a corrective action.

Referring to FIG. 4D, at block 440 of method 400D, the processing logic receives current trace data associated with producing products. The current trace data may be received from an electrical device 127 (e.g., one or more current clamps disposed around electrical feed conductors) and may include electrical current data or voltage data.

At block 442, the processing logic performs signal processing to break down the current trace data into sets of current component data mapped to component identifiers. In some embodiments, the processing logic uses a trained machine learning model to perform the signal processing (e.g., see method 400E of FIG. 4E). In some embodiments, the processing logic compares the current trace data to a library (e.g., library data 166 of FIG. 1). In some embodiments, the processing logic requests user input to identify a portion of the current trace data. In some embodiments, one or more components are to be turned on and off to isolate current component data (e.g., isolate by usage signature, isolate by fingerprint) from the current trace data (e.g., to determine which sets of current component data make up the current trace data and to identify the component that corresponds to each set of current component data).

At block 444, the processing logic provides the sets of current component data and the component identifiers as input to a trained machine learning model (e.g., the trained machine learning model of block 416 of FIG. 4B).

At block 446, the processing logic obtains, from the trained machine learning model, one or more outputs indicative of predictive data. The predictive data may indicate one or more of: predicted abnormalities in products; predicted abnormalities in components of the manufacturing equipment; predicted energy usage; predicted component failure; or the like. The predictive data may indicate a variation (e.g., from chamber matching for product-to-product uniformity) that is causing an abnormality in the product and/or manufacturing equipment. For example, abnormal characteristics of the manufacturing equipment (e.g., increased energy, drift over time, high number of motor cycles, etc.) may be indicative that a corrective action is to be performed.

At block 448, the processing logic causes, based on the predictive data, performance of a corrective action. In some embodiments, the performance of the corrective action may include one or more of: providing an alert to a user; interrupting functionality of the manufacturing equipment; updating manufacturing parameters; planning replacement of a component of the manufacturing equipment; causing one or more components to be in a sleep mode or an idle mode at particular times during manufacturing of the products to reduce energy usage; replacement of one or more components to reduce energy usage; causing preventative maintenance; causing a modification of the components (e.g., tightening mounting screws, replacing binding, etc.); or the like. The predictive data and/or corrective action may be indicative of a combination (e.g., combination of components, combination of manufacturing parameters) that is causing abnormalities (e.g., where just one of the items from the combination may not cause the abnormality by its own).

In some embodiments current performance data is received corresponding to the current trace data. The trained machine learning model may be re-trained (or a new model may be trained) based on the current trace data and the performance data.

Figure 4E:
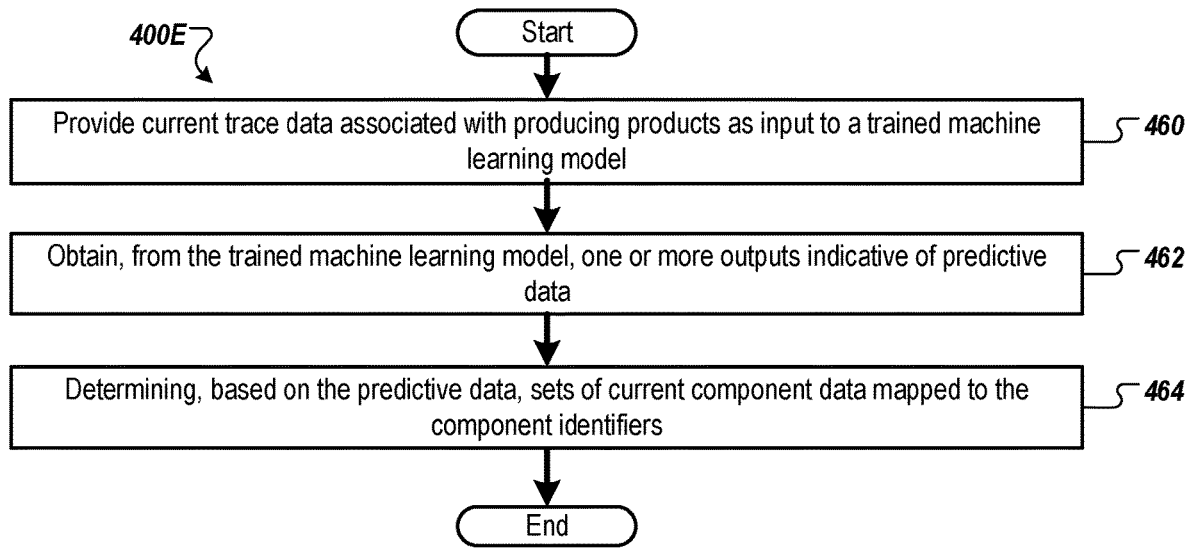

FIG. 4E is a method 400E for using a trained machine learning model (e.g., model 190A of FIG. 1) for performing signal processing.

Referring to FIG. 4E, at block 460 of method 400E, the processing logic provides current trace data (e.g., received in block 440 of FIG. 4D) associated with producing products as input to a trained machine learning model (e.g., the trained machine learning model of block 424 of FIG. 4C).

At block 462, the processing logic obtains, from the trained machine learning model, one or more outputs indicative of predictive data.

At block 464, the processing logic determines, based on the predictive data sets of current component data mapped to the component identifiers. The processing logic may store the sets of current component data mapped to component identifiers in the library (e.g., library data 166) for future signal processing. The sets of current component data and component identifiers may be used by FIG. 4D to determine performance of a corrective action. In some embodiments, the processing logic may cause a user device to display the prediction of the sets of current component data mapped to component identifiers. Responsive to user input confirming or overriding the prediction, the trained machine learning model may be re-trained based on the user input and the current trace data.

FIG. 5 is a block diagram 500 illustrating signal processing 530, according to certain embodiments.

Plot 510 represents trace data (e.g., historical trace data 146 or current trace data 154 of FIG. 1). Plots 520A-B represent sets of component data (e.g., sets of historical component data 148, sets of current component data 156 of FIG. 1) mapped to component identifiers (e.g., historical component identifiers 150, current component identifiers 158).

The trace data in plot 510 illustrates a combination of sensor data values from different components. The first component data of plot 520A illustrates isolated sensor data values for a first component identifier. The second component data of plot 520B illustrates isolated sensor data values for a second component identifier.

An electrical device 127 (e.g., including one or more current clamps) may determine the trace data of plot 510 corresponding to electrical feed conductor that is powering two or more components. The sensor data values in plot 510 may be a sum of the energy usage (e.g., electrical current, voltage, etc.) of the two or more components.

Signal processing 530 may be performed by processing logic (e.g., of predictive component 114 of FIG. 1, of corrective action component 122 of FIG. 1, a processing device, etc.). The processing logic may perform signal processing to generate the sets of component data mapped to corresponding component identifiers, as represented in plots 520A-B, from trace data, as represented in plot 510.

In some embodiments, the processing logic accesses a library (e.g., library data 166) that includes sets of historical component data mapped to component identifiers and performs the signal processing using the library data 166. The processing logic may compare the trace data to the library data 166 to determine the trace data is made up of particular sets of historical component data 148 (e.g., corresponding to historical component identifiers 150) in the library data 166. For example, the sum of first component data and second component data from the library data 166 may be substantially similar to the trace data of plot 510.

In some embodiments, the processing logic determines a set of component data that is not in the library. For example, trace data of plot 510 (e.g., collected by electrical device 127) minus first component data of plot 520A (e.g., from library data 166) equals second component data of plot 520B (e.g., not found in library data 166). The processing logic may determine a component that corresponds to the second component data (e.g., by prompting the user via a user device and receiving user input identifying the second component that corresponds to the second component data) and may add the second component data mapped to the second component to the library (e.g., library data 166).

In some embodiments, to perform the signal processing, the processing logic provides the trace data as input to a trained machine learning model (e.g., model 190A of FIG. 1) and obtains, from the trained machine learning model, output indicative of predictive data including sets of component data mapped to the component identifiers.

In some embodiments, the processing logic provides a visual representation of at least a portion of the predictive data (e.g., sets of component data mapped to the component identifiers) via a user device, receives user input via the user device confirming or overriding at least a portion of the predictive data, and using the user input to re-train the machine learning model.

In some embodiments, the processing logic causes (e.g., via prompts in a user device, via controlling the power supply) power to be provided to one or more components to isolate component data to determine the sets of component data that make up the trace data of plot 510.

Figure 6:
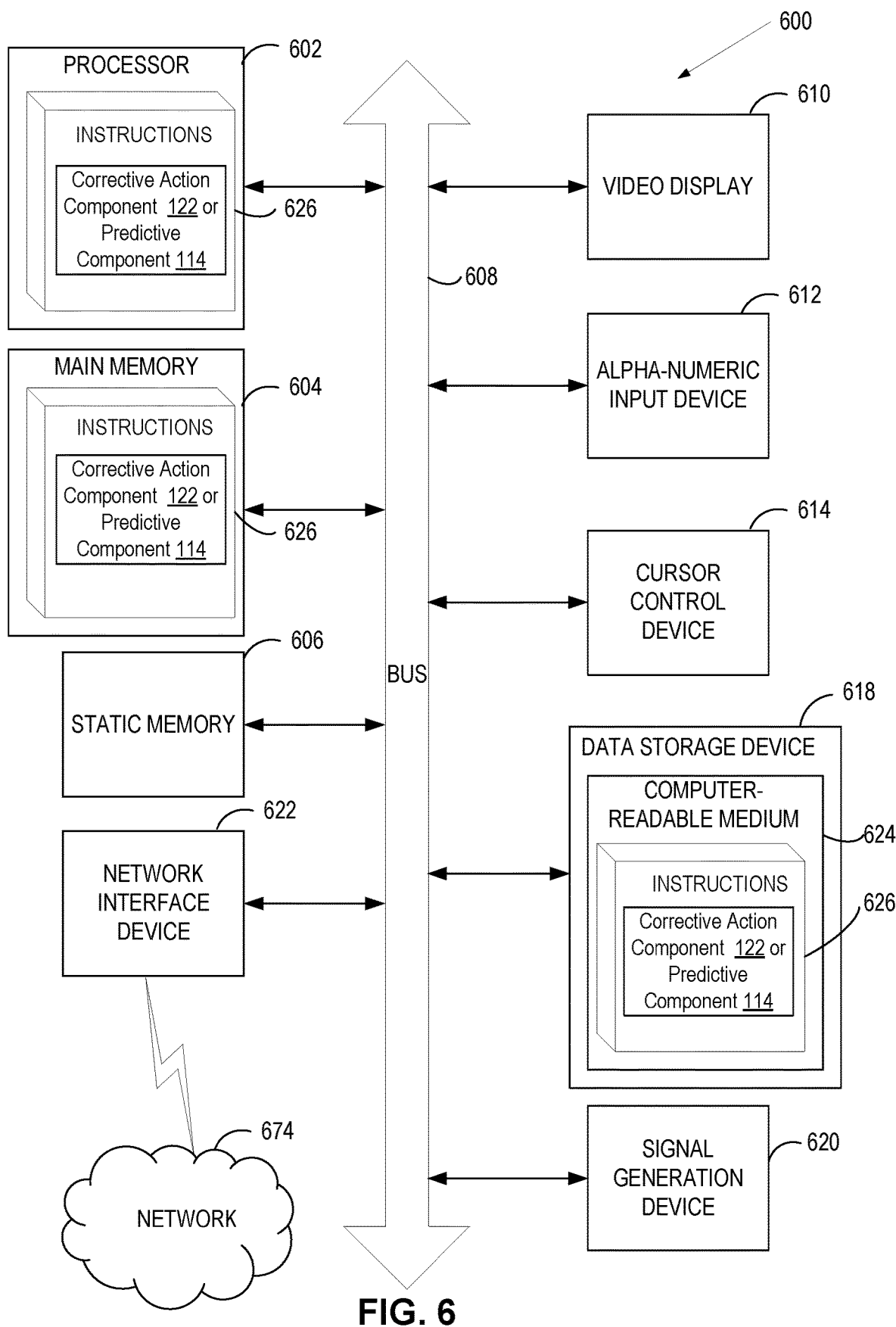
FIG. 6 is a block diagram illustrating a computer system, according to certain embodiments.

FIG. 6 is a block diagram illustrating a computer system 600, according to certain embodiments. In some embodiments, computer system 600 may be connected (e.g., via a network, such as a Local Area Network (LAN), an intranet, an extranet, or the Internet) to other computer systems. Computer system 600 may operate in the capacity of a server or a client computer in a client-server environment, or as a peer computer in a peer-to-peer or distributed network environment. Computer system 600 may be provided by a personal computer (PC), a tablet PC, a Set-Top Box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 600 may include a processing device 602, a volatile memory 604 (e.g., Random Access Memory (RAM)), a non-volatile memory 606 (e.g., Read-Only Memory (ROM) or Electrically-Erasable Programmable ROM (EEPROM)), and a data storage device 616, which may communicate with each other via a bus 608.

Processing device 602 may be provided by one or more processors such as a general purpose processor (such as, for example, a Complex Instruction Set Computing (CISC) microprocessor, a Reduced Instruction Set Computing (RISC) microprocessor, a Very Long Instruction Word (VLIW) microprocessor, a microprocessor implementing other types of instruction sets, or a microprocessor implementing a combination of types of instruction sets) or a specialized processor (such as, for example, an Application Specific Integrated Circuit (ASIC), a Field Programmable Gate Array (FPGA), a Digital Signal Processor (DSP), or a network processor).

Computer system 600 may further include a network interface device 622 (e.g., coupled to network 674). Computer system 600 also may include a video display unit 610 (e.g., an LCD), an alphanumeric input device 612 (e.g., a keyboard), a cursor control device 614 (e.g., a mouse), and a signal generation device 620.

In some implementations, data storage device 616 may include a non-transitory computer-readable storage medium 624 on which may store instructions 626 encoding any one or more of the methods or functions described herein, including instructions encoding components of FIG. 1 (e.g., corrective action component 122, predictive component 114, etc.) and for implementing methods described herein.

Instructions 626 may also reside, completely or partially, within volatile memory 604 and/or within processing device 602 during execution thereof by computer system 600, hence, volatile memory 604 and processing device 602 may also constitute machine-readable storage media.

While computer-readable storage medium 624 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "receiving," "performing," "providing," "obtaining," "causing," "accessing," "determining," "adding," "using," "training," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may include a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods described herein and/or each of their individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
    receiving, from a sensor secured proximate an electrical feed, current sensor data associated with energy provided by the electrical feed to a plurality of hardware components of semiconductor manufacturing equipment, wherein a first subset of the plurality of hardware components is configured to process semiconductor substrates, and wherein a second subset of the plurality of hardware components is configured to transport the semiconductor substrates;
    performing signal processing to break down the current sensor data into a plurality of sets of current hardware component data mapped to corresponding hardware component identifiers of a plurality of hardware component identifiers corresponding to the plurality of hardware components of the semiconductor manufacturing equipment;
    providing the plurality of sets of current hardware component data and the corresponding hardware component identifiers as input to a trained machine learning model;
    obtaining, from the trained machine learning model, one or more outputs indicative of predictive data; and
    causing, based on the predictive data, performance of one or more corrective actions associated with one or more of the plurality of hardware components of the semiconductor manufacturing equipment.

2. The method of claim 1, wherein the predictive data comprises one or more of:
    a predicted fail date for a hardware component of the semiconductor manufacturing equipment;
    predicted energy usage of the hardware component;
    predicted variance of the hardware component compared to other similar hardware components; or
    a predicted product quality to be caused by the hardware component.

3. The method of claim 1, wherein the performance of the one or more corrective actions comprises one or more of:
    replacement of a hardware component of the semiconductor manufacturing equipment prior to failure of the hardware component;
    preventative maintenance of the hardware component;
    providing an alert to a user associated with the hardware component or a manufacturing parameter associated with the hardware component; or
    updating the manufacturing parameter associated with the hardware component.

4. The method of claim 1, wherein the sensor comprises a current transformer (CT) clamp that senses magnetic fluctuations in the electrical feed coupled to the semiconductor manufacturing equipment and converts the magnetic fluctuations into the current sensor data comprising one or more of electrical current data or voltage data.

5. The method of claim 1 further comprising:
accessing a library comprising a plurality of sets of historical hardware component data mapped to second corresponding hardware component identifiers, wherein the performing of the signal processing is based on the library.

6. The method of claim 5 further comprising:
determining a first set of current hardware component data is not in the library;
determining a first hardware component that corresponds to the first set of current hardware component data; and
adding the first set of current hardware component data mapped to the first hardware component to the library.

7. The method of claim 1, wherein the performing of the signal processing comprises:
providing the current sensor data as input to a second trained machine learning model; and
obtaining, from the second trained machine learning model, one or more second outputs indicative of second predictive data comprising the plurality of sets of current hardware component data mapped to the corresponding hardware component identifiers.

8. The method of claim 7, wherein the second predictive data comprises a first set of current hardware component data mapped to a first hardware component identifier, wherein the method further comprises:
providing a visual representation of at least a portion of the second predictive data to a user device;
receiving, from the user device, user input confirming or overriding the at least a portion of the second predictive data; and
using the user input to re-train the second trained machine learning model.

9. The method of claim 1 further comprising:
receiving a plurality of sets of historical hardware component data mapped to the corresponding hardware component identifiers;
receiving a corresponding set of historical performance data for each of the plurality of sets of historical hardware component data; and
training a machine learning model with data input comprising the plurality of sets of historical hardware component data and target output comprising the corresponding set of historical performance data for each of the plurality of sets of historical hardware component data to generate the trained machine learning model.

10. A method comprising:
receiving a plurality of sets of historical hardware component data mapped to corresponding hardware component identifiers of a plurality of hardware components of semiconductor manufacturing equipment, wherein the plurality of sets of historical hardware component data mapped to the corresponding hardware component identifiers is based on historical sensor data received from a sensor secured proximate an electrical feed, the historical sensor data associated with energy provided by the electrical feed to the plurality of hardware components of the semiconductor manufacturing equipment, wherein a first subset of the plurality of hardware components is configured to process semiconductor substrates, wherein a second subset of the plurality of hardware components is configured to transport the semiconductor substrates, wherein each corresponding hardware component identifier is associated with a corresponding hardware component of the semiconductor manufacturing equipment, and wherein each of the plurality of sets of historical hardware component data corresponds to energy usage during operation of the corresponding hardware component;
receiving a corresponding set of historical performance data for each of the plurality of sets of historical hardware component data; and
training a machine learning model with data input comprising the plurality of sets of historical hardware component data and target output comprising the corresponding set of historical performance data for each of the plurality of sets of historical hardware component data to generate a trained machine learning model, the trained machine learning model being capable of generating one or more outputs indicative of predictive data to perform one or more corrective actions associated with one or more of the plurality of hardware components of the semiconductor manufacturing equipment.

11. The method of claim 10, wherein the corresponding set of historical performance data for each of the plurality of sets of historical hardware component data is associated with one or more of:
failure of a hardware component;
maintenance of the hardware component;
energy consumption of the hardware component; or
product quality associated with the hardware component.

12. The method of claim 10 further comprising:
receiving, from one or more sensors associated with the semiconductor manufacturing equipment, the historical sensor data; and
performing signal processing to break down the historical sensor data into the plurality of sets of historical hardware component data mapped to the corresponding hardware component identifiers.

13. The method of claim 12, wherein the performing of the signal processing comprises, for each of the plurality of hardware components of the semiconductor manufacturing equipment, operating the corresponding hardware component and identifying a corresponding set of historical hardware component data.

14. The method of claim 12 further comprising generating a library comprising the plurality of sets of historical hardware component sensor data mapped to the corresponding hardware component identifiers, wherein the library is to be used for the performing of the signal processing to break down current sensor data into a plurality of sets of current hardware component data mapped to the corresponding hardware component identifiers.

15. The method of claim 12 further comprising:
training a second machine learning model with second data input comprising the historical sensor data and second target output comprising the plurality of sets of historical hardware component data mapped to the corresponding hardware component identifiers to generate a second trained machine learning model, wherein the second trained machine learning model is to be used to perform the signal processing to break down current sensor data into a plurality of sets of current hardware component data mapped to the corresponding hardware component identifiers.

16. A non-transitory machine-readable storage medium storing instructions which, when executed cause a processing device to perform operations comprising:
receiving, from a sensor secured proximate an electrical feed, current sensor data associated with energy provided by the electrical feed to a plurality of hardware components of semiconductor manufacturing equipment, wherein a first subset of the plurality of hardware components is configured to process semiconductor substrates, and wherein a second subset of the plurality of hardware components is configured to transport the semiconductor substrates;

performing signal processing to break down the current sensor data into a plurality of sets of current hardware component data mapped to corresponding hardware component identifiers of a plurality of hardware component identifiers corresponding to the plurality of hardware components of the semiconductor manufacturing equipment;

providing the plurality of sets of current hardware component data and the corresponding hardware component identifiers as input to a trained machine learning model;

obtaining, from the trained machine learning model, one or more outputs indicative of predictive data; and causing, based on the predictive data, performance of one or more corrective actions associated with one or more of the plurality of hardware components of the semiconductor manufacturing equipment.

17. The non-transitory machine-readable storage medium of claim 16, wherein the predictive data comprises one or more of:
    a predicted fail date for a hardware component of the semiconductor manufacturing equipment;
    predicted energy usage of the hardware component;
    predicted variance of the hardware component compared to other similar hardware components; or
    a predicted product quality to be caused by the hardware component.

18. The non-transitory machine-readable storage medium of claim 16, wherein the performance of the one or more corrective actions comprises one or more of:
    replacement of a hardware component of the semiconductor manufacturing equipment prior to failure of the hardware component;
    preventative maintenance of the hardware component;
    providing an alert to a user associated with the hardware component or a manufacturing parameter associated with the hardware component; or
    updating the manufacturing parameter associated with the hardware component.

19. The non-transitory machine-readable storage medium of claim 16, wherein the sensor comprises a current transformer (CT) clamp that senses magnetic fluctuations in the electrical feed coupled to the semiconductor manufacturing equipment and converts the magnetic fluctuations into the current sensor data comprising one or more of electrical current data or voltage data.

20. The non-transitory machine-readable storage medium of claim 16, wherein the operations further comprise:
    accessing a library comprising a plurality of sets of historical hardware component data mapped to second corresponding hardware component identifiers, wherein the performing of the signal processing is based on the library.

* * * * *